United States Patent
Chen et al.

(10) Patent No.: US 10,302,172 B2
(45) Date of Patent: May 28, 2019

(54) WINDOW COVERING SYSTEM AND WINDOW COVERING CONTROL ASSEMBLY THEREOF

(71) Applicant: Nien Made Enterprise Co., Ltd., Taichung (TW)

(72) Inventors: Lin Chen, TaiChung (TW); Keng-Hao Nien, TaiChung (TW)

(73) Assignee: NIEN MADE ENTERPRISE CO., LTD., Taichung (TW)

( * ) Notice: Subject to any disclaimer, the term of this patent is extended or adjusted under 35 U.S.C. 154(b) by 182 days.

(21) Appl. No.: 15/406,772

(22) Filed: Jan. 15, 2017

(65) Prior Publication Data
US 2017/0211318 A1 Jul. 27, 2017

Related U.S. Application Data

(60) Provisional application No. 62/318,771, filed on Apr. 6, 2016.

(30) Foreign Application Priority Data

Jan. 22, 2016 (CN) ...................... 2016 2 0065142 U

(51) Int. Cl.
*E06B 9/322* (2006.01)
*F16F 15/18* (2006.01)
(Continued)

(52) U.S. Cl.
CPC ............ *F16F 15/18* (2013.01); *B65H 75/486* (2013.01); *E06B 9/307* (2013.01); *E06B 9/322* (2013.01);
(Continued)

(58) Field of Classification Search
CPC ........ F16F 15/18; F16F 9/125; F16F 2222/04; F16F 2222/06; F16F 2222/12;
(Continued)

(56) References Cited

U.S. PATENT DOCUMENTS

| 4,681,279 A | 7/1987 | Nakamura |
| 5,123,472 A | 6/1992 | Nagashima et al. |

(Continued)

FOREIGN PATENT DOCUMENTS

| AU | 782302 B2 | 7/2005 |
| AU | 2012370499 A1 | 9/2014 |

(Continued)

OTHER PUBLICATIONS

Chinese Patent Office. Office action 100089, dated Sep. 12, 2018. 8 pages.

*Primary Examiner* — Beth A Stephan
(74) *Attorney, Agent, or Firm* — Muncy, Geissler, Olds & Lowe, P.C.

(57) ABSTRACT

A window covering control assembly is used in a window covering system. The window covering control assembly comprises a driving module and a speed control module, and is provided in the shell, engaged to the weight element for simultaneous operation therewith. The driving module comprises a cord collecting assembly mounted in the shell. The cord collecting assembly is configured to operate in a first direction while a first driving force acting upon the cord collecting assembly such that the weight element descends away from the shell. The first driving force comprises at least a weight of the weight element. The speed control module is positioned corresponding to the driving module. A resistance force is selectively generated between the speed control module and the driving module, and this force reduces an operation speed of the cord collecting assembly in the first direction.

28 Claims, 24 Drawing Sheets

(51) Int. Cl.
*B65H 75/48* (2006.01)
*E06B 9/307* (2006.01)
*E06B 9/324* (2006.01)
*F16F 9/12* (2006.01)
*E06B 9/388* (2006.01)
*E06B 9/80* (2006.01)

(52) U.S. Cl.
CPC .............. *E06B 9/324* (2013.01); *F16F 9/125* (2013.01); *E06B 9/388* (2013.01); *E06B 2009/3222* (2013.01); *E06B 2009/807* (2013.01); *F16F 2222/04* (2013.01); *F16F 2222/06* (2013.01); *F16F 2222/12* (2013.01); *F16F 2224/025* (2013.01); *F16F 2224/045* (2013.01)

(58) Field of Classification Search
CPC .......... F16F 2224/025; F16F 2224/045; B65H 5/486; E06B 9/307; E06B 9/72; E06B 9/78; E06B 9/68; E06B 9/322; E06B 9/80; E06B 9/388; E06B 9/368; E06B 9/324; E06B 2009/807; E06B 2009/3222
See application file for complete search history.

(56) References Cited

U.S. PATENT DOCUMENTS

| | | | |
|---|---|---|---|
| 6,129,131 A | 10/2000 | Colson | |
| 6,155,328 A | 12/2000 | Welfonder | |
| 6,332,491 B1 | 12/2001 | Rossini | |
| 6,715,528 B2 | 4/2004 | Rossini | |
| 6,948,544 B2 | 9/2005 | Nien | |
| 6,955,207 B2 | 10/2005 | Minder | |
| 7,198,089 B2 | 4/2007 | Hsu | |
| 7,341,091 B2 | 3/2008 | Nien | |
| 7,406,995 B2* | 8/2008 | Huang | E06B 9/322 160/170 |
| 7,578,334 B2 | 8/2009 | Smith et al. | |
| 7,717,154 B2 | 5/2010 | Cheng | |
| 8,230,896 B2 | 7/2012 | Anderson | |
| 8,267,145 B2 | 9/2012 | Fraser | |
| 9,062,492 B2 | 6/2015 | Yu | |
| 9,127,500 B2 | 9/2015 | Huang | |
| 9,284,774 B2 | 3/2016 | Yu et al. | |
| 2007/0151675 A1* | 7/2007 | Nien | E06B 9/30 160/84.05 |
| 2007/0151676 A1* | 7/2007 | Lin | E06B 9/262 160/170 |
| 2009/0078380 A1 | 3/2009 | Cheng | |
| 2009/0120592 A1 | 5/2009 | Lesperance | |
| 2011/0290429 A1 | 12/2011 | Cheng | |
| 2013/0037225 A1 | 2/2013 | Huang | |
| 2013/0087415 A1 | 4/2013 | Hsieh | |
| 2014/0083631 A1 | 3/2014 | Huang | |
| 2014/0131502 A1 | 5/2014 | Zhu | |
| 2014/0291431 A1 | 10/2014 | Huang | |
| 2015/0059992 A1 | 3/2015 | Liu | |
| 2015/0136336 A1 | 5/2015 | Huang | |
| 2015/0136892 A1* | 5/2015 | Hung | E06B 9/322 242/397.5 |
| 2015/0211296 A1 | 7/2015 | Zhang et al. | |
| 2015/0354275 A1 | 12/2015 | Huang et al. | |
| 2015/0368968 A1 | 12/2015 | Smith | |
| 2016/0340975 A1* | 11/2016 | Huang | E06B 9/322 |

FOREIGN PATENT DOCUMENTS

| | | |
|---|---|---|
| CA | 2805798 A1 | 8/2014 |
| CN | 101021139 B | 7/2010 |
| CN | 203584273 | 5/2014 |
| CN | 204552565 U | 8/2015 |
| CN | 204646046 | 9/2015 |
| DE | 202007002787 U1 | 7/2008 |
| JP | H04250287 A | 9/1992 |
| JP | 1993018168 A | 1/1993 |
| JP | H1046956 A | 2/1998 |
| JP | 2000145328 A | 5/2000 |
| JP | 2000220369 A | 8/2000 |
| JP | 3261106 B2 | 2/2002 |
| JP | 3378813 B2 | 2/2003 |
| JP | 3442670 B2 | 9/2003 |
| JP | 3485164 B2 | 1/2004 |
| JP | 2008013950 A | 1/2008 |
| JP | 4074420 B2 | 4/2008 |
| JP | 2013072183 A | 4/2013 |
| JP | 2013072224 A | 4/2013 |
| JP | 2015161147 A | 9/2015 |
| JP | 2015180810 A | 10/2015 |
| TW | I246415 B | 1/2006 |
| TW | M305849 U | 2/2007 |
| TW | I463961 B | 12/2014 |
| WO | 2010125951 A1 | 11/2010 |
| WO | 2016009881 A1 | 1/2016 |

\* cited by examiner

WINDOW COVERING SYSTEM AND WINDOW COVERING CONTROL ASSEMBLY THEREOF

CROSS-REFERENCE TO RELATED APPLICATIONS

This application claims priority to U.S. Provisional Patent Application No. 62/318,771, filed Apr. 6, 2016, and claims priority to Chinese Utility Model Patent Application No. 201620065142.0 filed on Jan. 22, 2016, the contents of which are incorporated by reference herein.

FIELD

The present disclosure generally relates to a window covering control assembly. More particularly, the present disclosure relates to a window covering control assembly having functions of releasing and slow-descending a bottom rail of a window covering system. The window covering control assembly can effectively control an expanding speed of a window covering system.

BACKGROUND

A conventional cordless window covering system includes a headrail, a bottom rail, a covering material and a driving assembly, wherein the driving assembly is usually a spring box. The covering material is disposed between the headrail and the bottom rail, wherein the covering material can be expanded or collected below the headrail while the bottom rail ascends or descends. During the collection of the covering material, the spring box provides a necessary driving force for the covering material to be collected, wherein the driving force is accumulated in the spring box during the expansion of the covering material. A retaining position of the covering material during collection and expansion is controlled by a balance between the driving force of the spring box, a friction force of the window covering system and an overall weight of the bottom rail and the covering material. In other words, when the weight of the covering material and the bottom rail is balanced against the friction force of the window covering system, the bottom rail stops at the retaining position such that light blockage of the covering material is maintained. However, it is difficult to control the overall friction force of the window covering system effectively comparing to the weight of the bottom rail and the covering material. In addition, the spring box provides the driving force by a spiral spring, which has a potential problem of losing elasticity due to fatigue. Moreover, the closer the bottom rail ascends to the headrail, the more covering material accumulates on the bottom rail, and hence the heavier the overall weight of the bottom rail and the covering material. Therefore, it is likely that the bottom rail would more or less descend for a distance, which is undesired, from a desired retaining position. In such case, it is inconvenient and annoying to anyone operating the window covering system.

In order to solve the above-mentioned problem, the window covering system may further include a retaining assembly to hold the bottom rail at the retaining position; and therefore the problem of undesired descending of the bottom rail due to gravity can be solved. However, a releasing assembly corresponding to the retaining assembly is needed to release the bottom rail. Since the reachable height of users varies, it is inconvenient when the bottom rail or the releasing assembly is at a position beyond users' reach. In addition, when the bottom rail is released from the retaining assembly, the covering material may expand rapidly to cause damage to the mechanical components of the window covering system or hurt the users.

SUMMARY

In view of above, the present disclosure provides a window covering system and a window covering control assembly thereof. The window covering control assembly and the window covering system of the present disclosure can effectively control the expansion and collection of the covering material by a speed control module of the window covering control assembly.

The window covering control assembly is used in a window covering system. The window covering system comprises a shell, a weight element, a covering material, and the window covering control assembly. The covering material is provided between the shell and the weight element. At least one lifting cord is passed through the covering material. The lifting cord comprises two ends, wherein one end of the lifting cord is connected to the window covering control assembly, and the other end of the lifting cord is connected to the weight element. Therefore, operation of the window covering control assembly expands or collects the covering material via the lifting cord while the bottom rail descending away from the shell or ascending towards the shell. The widow covering control assembly comprises a driving module and a speed control module. The driving module is provided in the shell, wherein the driving module and the weight element are configured to operate simultaneously. The driving module comprises a driving unit and a cord collecting wheel, wherein the driving unit and the cord collecting wheel are configured to operate simultaneously. The cord collecting wheel is rotatably mounted in the shell. The lifting cord is connected to the cord collecting wheel, such that one end of the lifting cord is coupled to the cord collecting wheel and the other end is coupled to the weight element. The cord collecting wheel is configured to rotate in a first direction to release the lifting cord as a first driving force acting upon the cord collecting wheel, and therefore the weight element descends from the shell to expand the covering material, wherein the first driving force comprises at least a weight of the weight element. The speed control module is positioned corresponding to the driving module such that a resistance force is generated between the speed control module and the driving module. When the resistance force is generated between the speed control module and the driving module, a rotating speed of the cord collecting wheel in the first direction is reduced, and therefore a descending speed of the weight element away from the shell is reduced.

Comparing to the conventional cordless window covering system, the window covering system and the window covering control assembly of the present disclosure can effectively control collection and expansion of the covering material by operating the driving module and the speed control module of the window covering control assembly simultaneously, and therefore an expanding speed of the covering material can be reduced.

BRIEF DESCRIPTION OF THE DRAWINGS

Implementations of the present technology will now be described, by way of example only, with reference to the attached figures.

DETAILED DESCRIPTION

Figure 1:
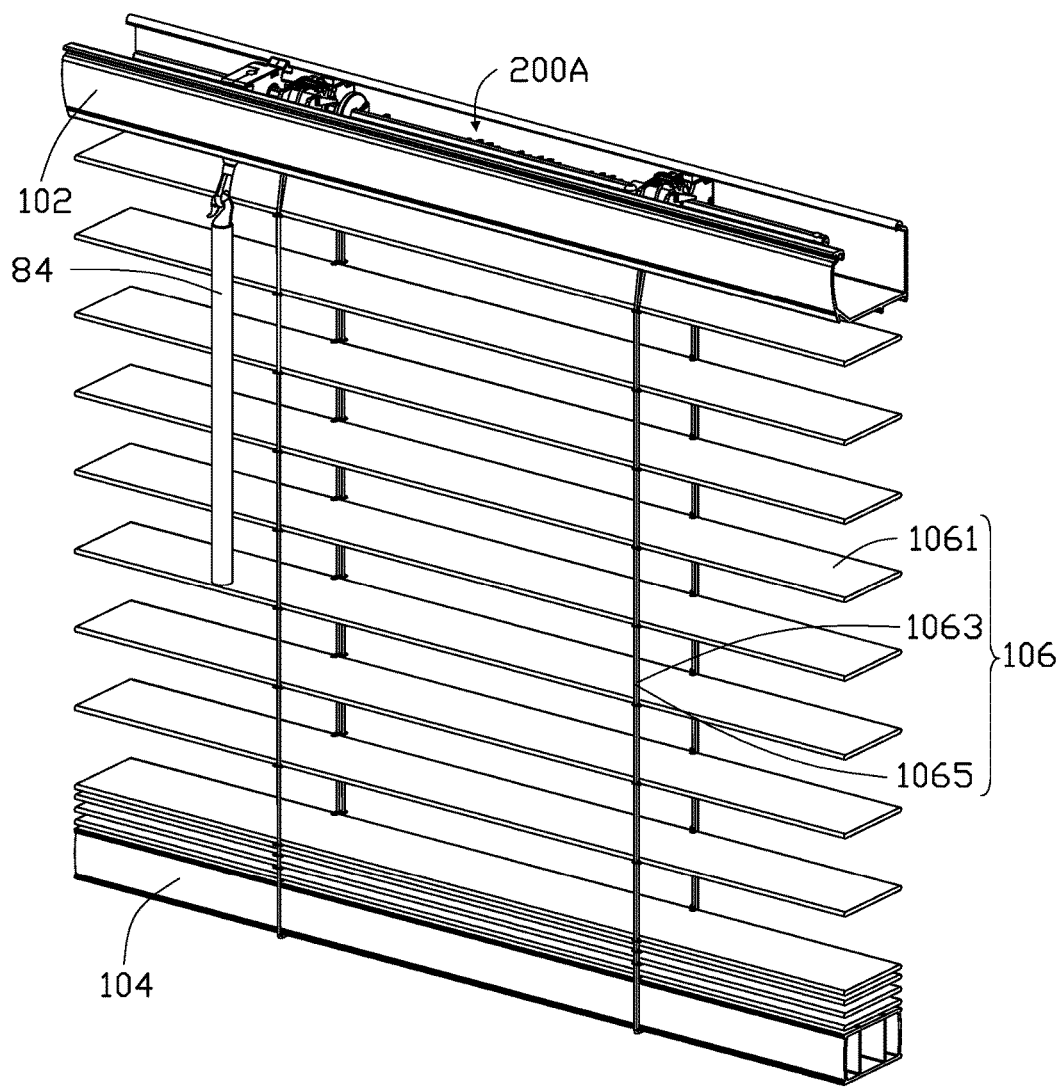
FIG. 1 is a perspective view of a window covering system according to one embodiment of the present disclosure.

The present disclosure will now be described more fully hereinafter with reference to the accompanying drawings, in which exemplary embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Like reference numerals refer to like elements throughout.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

It will be understood that the term "and/or" includes any and all combinations of one or more of the associated listed items. It will also be understood that, although the terms first, second, third etc. may be used herein to describe various elements, components, regions, parts and/or sections, these elements, components, regions, parts and/or sections should not be limited by these terms. These terms are only used to distinguish one element, component, region, part or section from another element, component, region, layer or section. Thus, a first element, component, region, part or section discussed below could be termed a second element, component, region, layer or section without departing from the teachings of the present disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The description will be made as to the embodiments of the present disclosure in conjunction with the accompanying drawings in FIGS. 1 to 35. Reference will be made to the drawing figures to describe the present disclosure in detail, wherein depicted elements are not necessarily shown to scale and wherein like or similar elements are designated by same or similar reference numeral through the several views and same or similar terminology.

The present disclosure will be further described hereafter in combination with figures.

Referring to FIG. 1, a perspective view of a window covering system according to one embodiment of the present disclosure, the window covering system 100 comprises a shell 102, a weight element 104, a covering material 106, at least one lifting cord 1063, at least one ladder 1065, and a window covering control assembly 200A. The covering material 106 is provided between the shell 102 and the weight element 104. The window covering system 100 can be in different forms for different usage or design such as a blind, a cellular shade, a roman shade, or a roller shade, but not limited thereto. In one embodiment of the present disclosure, the window covering system 100 is provided in a form of a blind, wherein the covering material 106 is defined by a plurality of slats 1061. The shell 102 can be a headrail corresponding to the weight element 104 such that the headrail is positioned above the weight element 104. Alternatively, the shell 102 can also be a frame base that can be manufactured as a module for easy installation.

Figure 2:
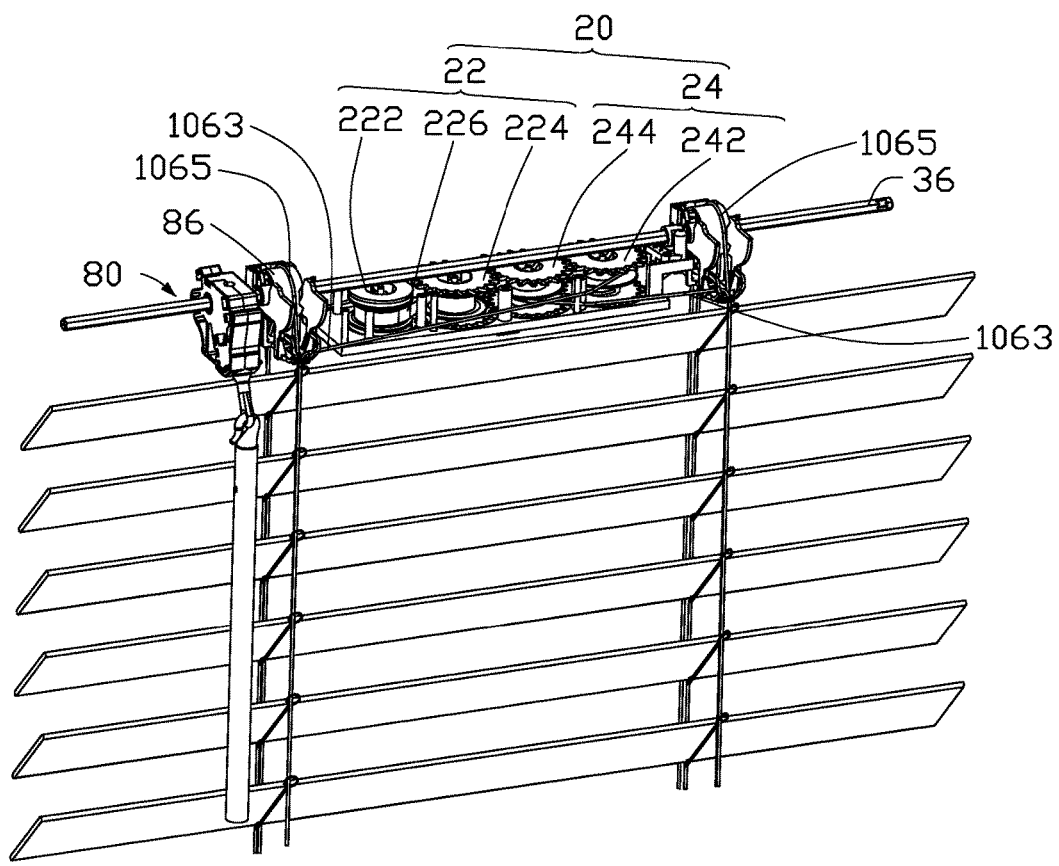
FIG. 2 is a perspective view of a window covering control assembly of the window covering system in FIG. 1.
Figure 3:
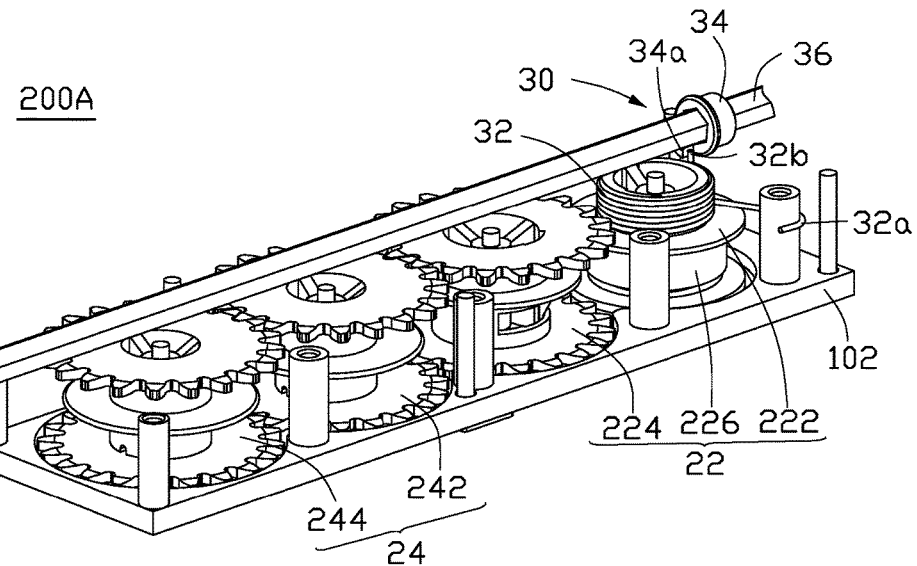
FIG. 3 is a perspective view of a speed control module of the window covering control assembly of the window covering system in FIG. 1 according to one embodiment of the present disclosure.
Figure 4:
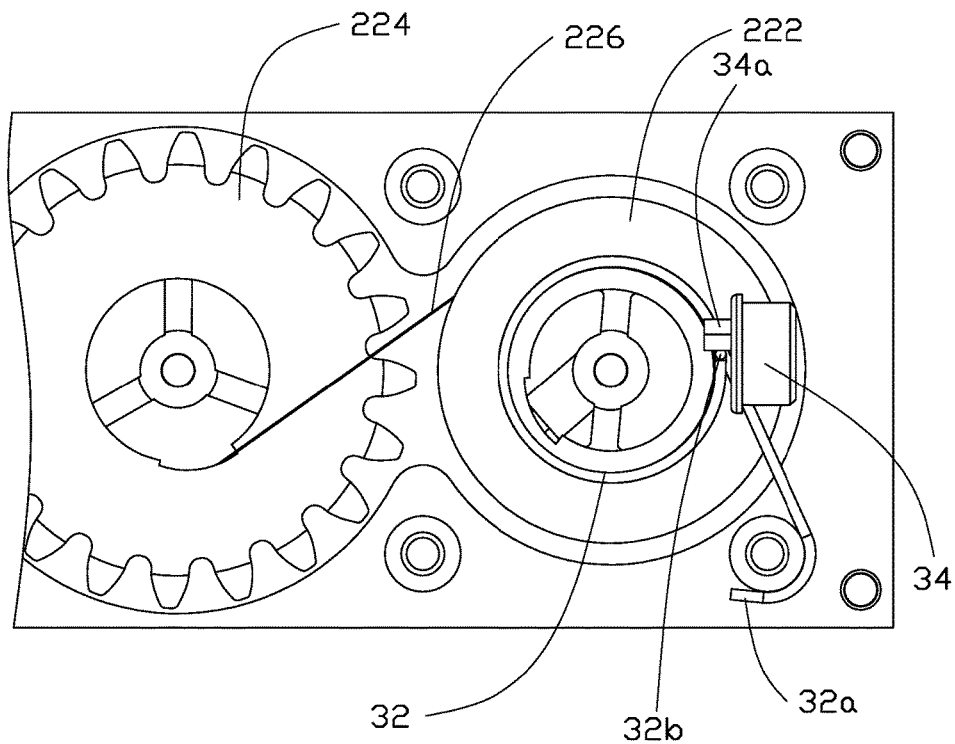
FIG. 4 is a top view of the speed control module in FIG. 3.

Referring to FIG. 1 to FIG. 4, FIG. 2 is a perspective view of the window covering control assembly of the window covering system in FIG. 1. FIG. 3 is a perspective view of a speed control module of the window covering control assembly of the window covering system according to one embodiment of the present disclosure. FIG. 4 is a partial top view of a speed control module in FIG. 3. In one embodiment of the present disclosure, the window covering control assembly 200A comprises a driving module 20 and a speed control module 30.

Referring to FIG. 2, the driving module 20 comprises a driving unit 22 and a cord collecting assembly 24, wherein the driving unit 22 comprises a storing wheel 222, a driving wheel 224, and a resilient member 226, and wherein the cord collecting assembly 24 comprises a cord collecting wheel 242. The storing wheel 222 and the driving wheel 224 are rotatably mounted on the shell 102 to rotate with respect to the shell 102. In one embodiment of the present disclosure, the resilient member 226 is a spiral spring. The spiral spring comprises two ends, wherein one end is connected to the storing wheel 222, and the other end is connected to the driving wheel 224. For ease of illustration, an initial state of the resilient member 226 is defined as the resilient member 226 winding around the storing wheel 222 while the weight element 104 being at a position closest to the shell 102 such that the covering material 106 is fully collected, wherein the resilient member 226 comprises a winding diameter which is corresponding to a thickness of the resilient member 226 around the storing wheel 222. During a process of expansion of the covering material 106 from fully collected to fully expanded as shown in FIG. 1, the weight element 104 descends from the position closest to the shell 102, as well as the resilient member 226 unwinds from the storing wheel 222 and winds around the driving wheel 224 gradually, thereby the winding diameter of the resilient member 226 wound about the storing wheel 222 reduces.

In one embodiment of the present disclosure, the cord collecting assembly 24 comprises two cord collecting wheels 242, 244. The cord collecting wheels 242, 244 are rotatably mounted on the shell 102 to rotate with respect to the shell 102. The cord collecting wheels 242, 244 are engaged by toothed engagement to rotate simultaneously. Using the cord collecting wheel 242 as an example, the cord collecting wheel 242 can rotate in a first direction and a second direction with respect to the shell 102. One end of the lifting cord 1063 is bound to the cord collecting wheel 242, and the other end of the lifting cord 1063 is passed through the covering material 106 and bound to the weight element 104. The driving wheel 224 and the cord collecting wheels 242, 244 are engaged by toothed engagement to rotate simultaneously, thereby the driving wheel 224, the resilient member 226 and the cord collecting assembly 24 are engaged to operate simultaneously.

The cord collecting wheel 242 is rotatably mounted on the shell 102 such that the cord collecting wheel 242 can be driven by an external force to rotate in the first direction or the second direction, and the cord collecting wheel 242 is configured to collect or release the lifting cord 1063 which is connected to the weight element 104. For ease of illustration, it is defined that the cord collecting wheel 242 is driven by a first driving force to rotate in the first direction to release the lifting cord 1063 which is collected thereon, thereby the weight element 104 descends away from the shell 102, as well as the covering material 106 expands. The first driving force described herein is at least a weight of the weight element 104 or the weight of the weight element 104 in combination with a weight of the covering material 106 accumulated thereon. The resilient member 226 of the driving unit 22 gradually winds around the driving wheel 224 as the covering material 106 expands. When the cord collecting wheel 242 is rotated in a second direction by a second driving force to collect the lifting cord 1063 on the cord collecting wheel 242, thereby the weight element 104 ascends toward the shell 102, as well as the covering material 106 is collected toward the shell 102, wherein the second driving force is a recovery force unloaded by the resilient member 226 of the driving unit 22. It should be noted that, in one embodiment of the present disclosure, the first driving force is greater than the second driving force such that the weight of the weight element 104 is greater than the recovery force unloaded by the resilient member 226 of the driving unit 22. In addition, the cord collecting wheel 242 and the cord collecting wheel 244 for collecting or releasing the lifting cord 1063 can be substituted by any other electrical or mechanical devices which functions to collect or release the lifting cord 1063, such as a motor, a pulley, wherein the cord collecting wheel, the motor, the pulley, and any other electrical or mechanical devices which functions in the same way are known as cord collecting assembly 24.

In FIG. 3, a speed control module 30 comprises a friction member 32, an abutting member 34, and a connecting shaft 36. In one embodiment of the present disclosure, the friction member 32 is shown as a restriction spring. The friction member 32 is sleeved to the storing wheel 222. The abutting member 34 is sleeved to the connecting shaft 36 to rotate simultaneously with the connecting shaft 36. One end of the connecting shaft 36 is connected to a driving source (not shown in the figures) to drive the abutting member 34 to rotate. The driving source can be electricity power input or human power input, but not limited thereto. The friction member 32 has two ends 32a, 32b. The end 32a of the friction member 32 is fixed to the shell 102 and not movable while the other end 32b of the friction member is a free end. The abutting member 34 comprises an abutting structure 34a corresponding to the end 32b of the friction member 32 such that the abutting structure 34a can push the end 32b when the abutting member 34 is rotated.

When no external force is applied to the weight element 104 or the friction member 32, the friction member 32 coils tightly around the storing wheel 222 to inhibit the storing wheel 222 from rotating. Hence, all force acting upon the whole window covering system 100 is balanced, and therefore the weight element 104 can stop at any position. When there is a need to expand the covering material 106, the connecting shaft 36 can be operated to drive the abutting member 34 to rotate, and thus the abutting structure 34a of the abutting member 34 pushes the free end 32b of the friction member 32. Hence, a diameter of the friction member 32 is increased such that reduces a restriction force of the friction member 32 acting upon the storing wheel 222, and thereby the storing wheel 222 is allowed to rotate with respect to the friction member 32. Meanwhile, an inner side of the friction member 32 is in contact with the storing wheel 222 such that a friction force is generate in between to reduce a rotating speed of the storing wheel 222 as well as a rotating speed of the cord collecting assembly 24 which operate simultaneously with storing wheel 222. Therefore, an expanding speed of the covering material 106 is also reduced. When there is a need to collect the covering material 106, an upward force opposite to the first driving force can be applied to the weight element 104 to balance against the first driving force in order to ascend the weight element 104. Meanwhile, the second driving force resists the restriction force of the friction member 32 to drive the cord collecting wheel 242 to rotate in the second direction to collect the lifting cord 1063 such that cooperating with the ascending of the weight element 104. In one embodiment of the present disclosure, the friction member 32 is sleeved to the storing wheel 222, but not limited thereto. Any wheel of the driving unit 22 or the cord collecting assembly 24, which is engaged thereto for simultaneous operation, can be sleeved by the friction member 32 to achieve the same result. Alternatively, an additional wheel, which is engaged to the driving unit 22 or the cord collecting assembly 24 for simultaneous operation, can also be employed.

Figure 5:
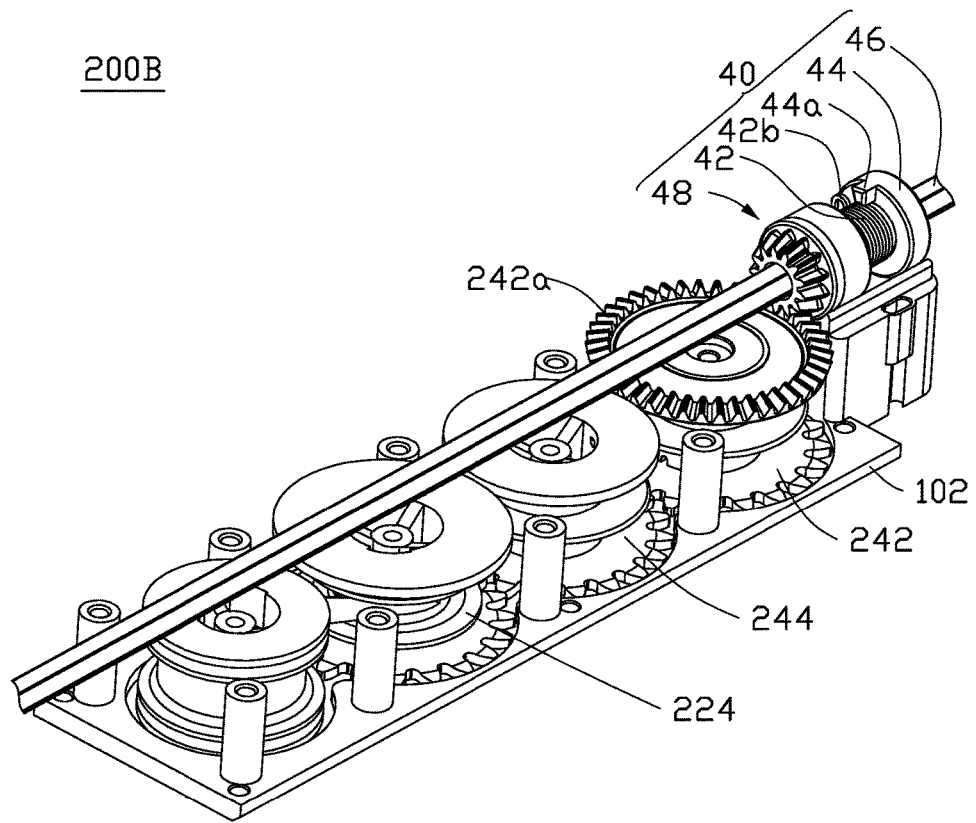
FIG. 5 is a perspective view of a speed control module of the window covering control assembly of the window covering system in FIG. 1 according to another embodiment of the present disclosure.
Figure 6:
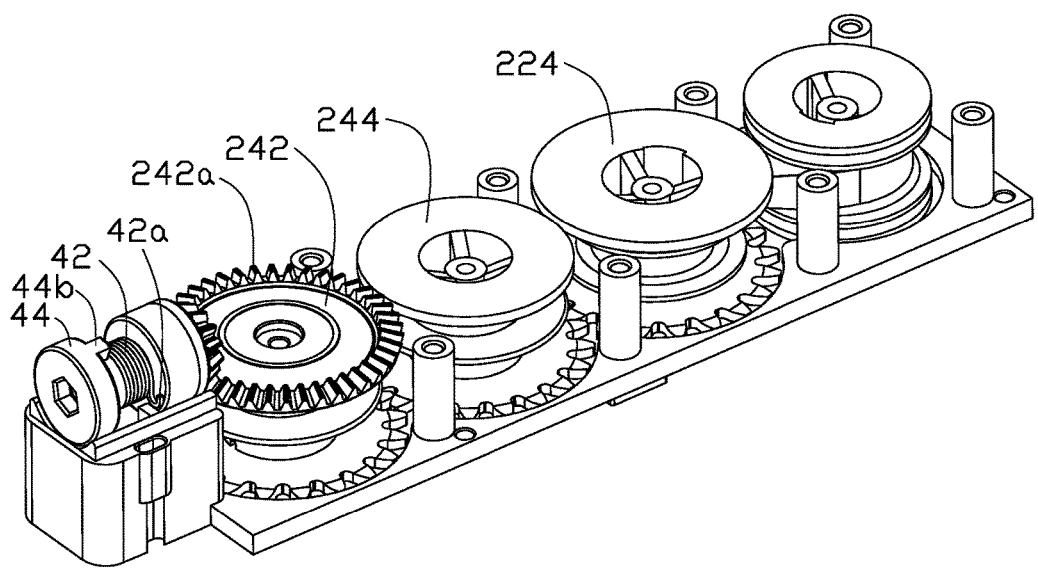
FIG. 6 is a perspective view of the speed control module in FIG. 5 from another angle of view.
Figure 7:
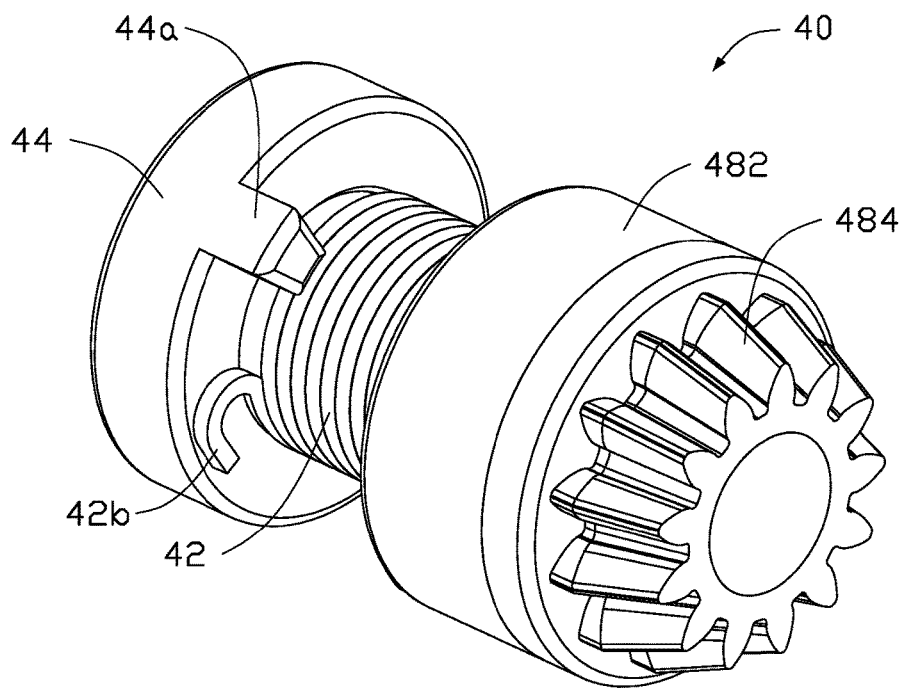
FIG. 7 is a perspective view of the speed control module in FIG. 6.
Figure 8:
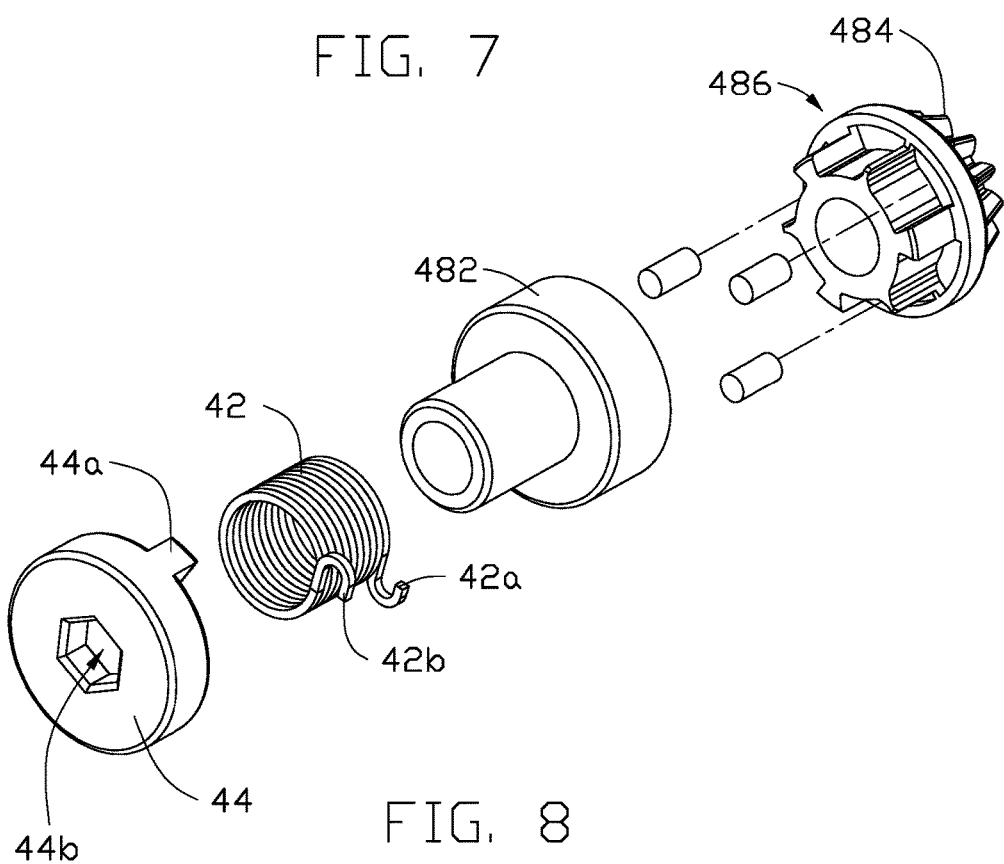
FIG. 8 is an exploded view of the speed control module in FIG. 7.

Referring to FIG. 5 to FIG. 8, another embodiment of the speed control module of the window covering control assembly is disclosed. Wherein, FIG. 5 is a perspective view of the speed control module of the window covering control assembly in FIG. 1 according to one embodiment of the present disclosure. FIG. 6 is a perspective view of the speed control module in FIG. 5 from another angle of view. FIG. 7 is a perspective view of the speed control module in FIG. 6. FIG. 8 is an explode view of the speed control module in FIG. 7. In one embodiment of the present disclosure, the speed control module 40 of the window covering control assembly 200B comprises a friction member 42, an abutting member 44, a connecting shaft 46, and a one-way clutch 48. The abutting member 44 and the one-way clutch 48 are sleeved to the connecting shaft 46, and the abutting member 44 has a polygonal hole matching to the outer shape of the connecting shaft 46, and thus the abutting member 44 can rotate simultaneously with the connecting shaft 46. The one-way clutch 48 comprises an outer case 482, a first engaging gear 484, and a clutch member 486, wherein the outer case 482 is a hollow cylinder, and one side of the clutch member 486 is disposed in one end of the outer case 482. The clutch member 486 can only rotate relative to the outer case 482 in one direction. In one embodiment of the present disclosure, the clutch member 486 can be a one-way roller clutch as shown in FIG. 8, which is a standard one-way clutch without further description. Besides the one-way roller clutch structure, other types of one-way clutch can also be used to achieve the same result of one-way clutching. The other side of the clutch member 486 is the first engaging gear 484, which is engaging to a second engaging gear 242a of the cord collecting wheel 242 by a toothed engagement. Therefore, the clutch member 486 of the one-way clutch 48 can rotate simultaneously with the cord collecting wheel 242.

The friction member 42 is shown as a restriction spring. The restriction spring is sleeved to the outer case 482 of the one-way clutch 48. The friction member 42 has two ends 42a, 42b. The end 42a of the friction member 42 is fixed to the shell 102 and not movable while the other end 42b of the friction member 42 is a free end. The abutting member 44 comprises an abutting structure 44a corresponding to the free end 42b of the friction member 42 such that the abutting structure 44a can push the end 42b when the abutting member 34 is rotated. When no external force is applied to the friction member 42, the friction member 42 coils tightly around the outer case 482 to inhibit the outer case 482 from rotating with respect to the friction member 42. One end of the connecting shaft 46 is connected to a driving source (not shown in the figures) to drive the abutting member 44 to rotate.

When no external force is applied to the weight element 104 or the friction member 42, the friction member 42 holds tightly around the outer case 482 to inhibit the one-way clutch 48 from rotating with respect to the friction member 42. Meanwhile, all force acting upon the window covering system is balanced, and therefore the weight element 104 can stop at any position. When there is a need to expand the covering material 106, the connecting shaft 46 can be operated to drive the abutting member 44 to rotate, and thus the abutting structure 44a pushes the free end 42b of the friction member 42. Hence, the diameter of the friction member 42 is increased such that reduces a restriction force of the friction member 42 acting upon the outer case 482, and thereby the outer case 482 is allowed to rotate with respect to the friction member 42. Meanwhile, the inner side of the friction member 42 is in contact with the outer case 482 such that a friction force is generated in between to provide a resistance force to the cord collecting wheel 242 via the simultaneous rotation of the first engaging gear 484 and the second engaging gear 242a. Therefore, the rotating speed of the cord collecting wheel 242, the other cord collecting wheel 244, and the rotating speed of the driving unit 22 is reduced due to simultaneous rotation in between. Thus, the expanding speed of the covering material 106 is reduced. When there is a need to collect the covering material 106, an upward force opposite to the first driving force can be applied to the weight element 104 to balance against the first driving force in order to ascend the weight element 104 for collecting the covering material 106. Meanwhile, the second driving force drives the cord collecting wheel 242 to rotate in a second direction to collect the lifting cord 1063, and the clutch member 486 of the one-way clutch 48 allows the first engaging gear 484 to rotate with respect to the outer case 482, and thus the restriction force of the friction member 42 does not transfer to the cord collecting wheel 242 to affect the rotation of the cord collecting wheel 242 even when the friction member 42 coils tightly around the outer case 482.

Figure 9:
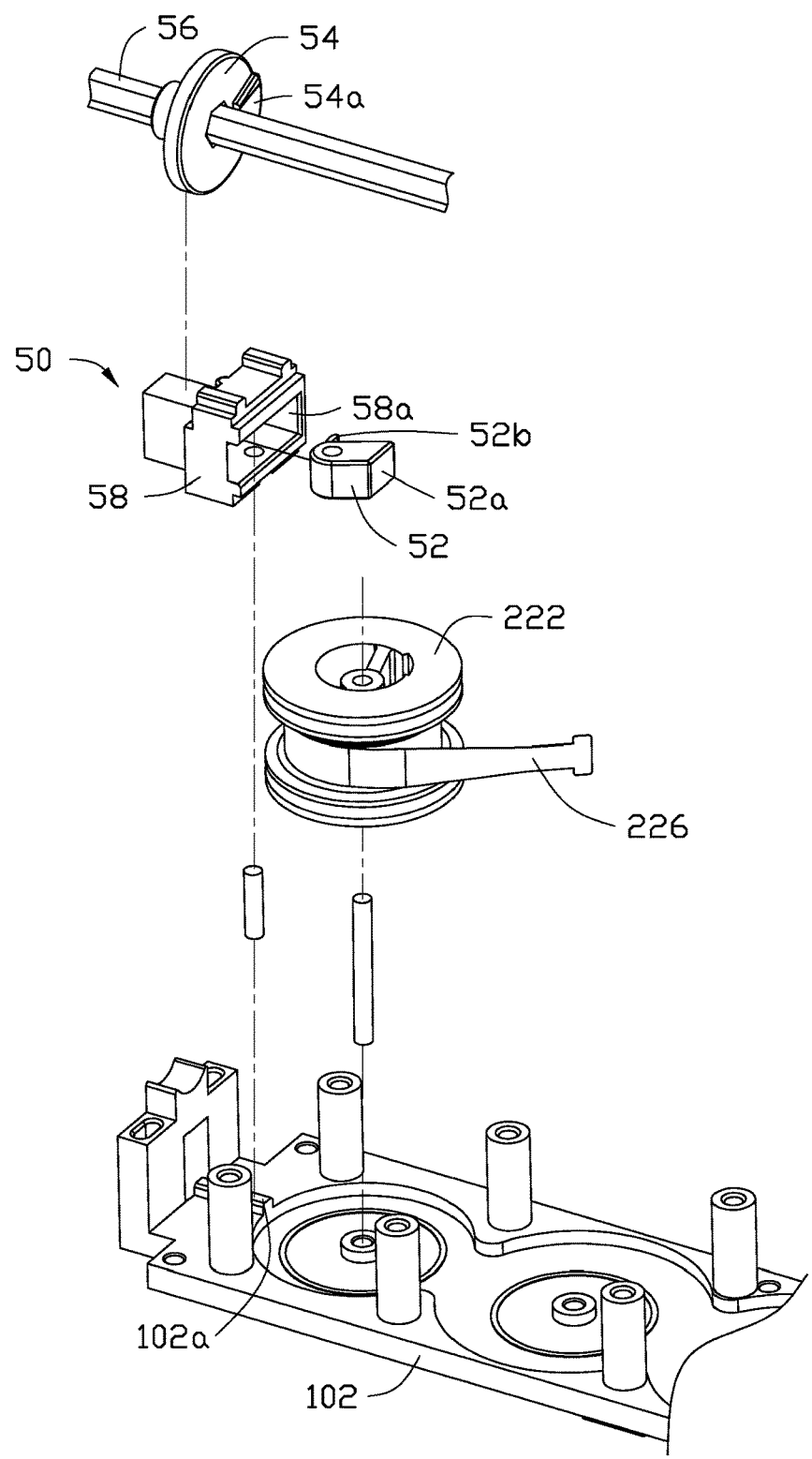
FIG. 9 is an exploded view of a speed control module of the window covering control assembly of the window covering system in FIG. 1 according to another embodiment of the present disclosure.
Figure 10:
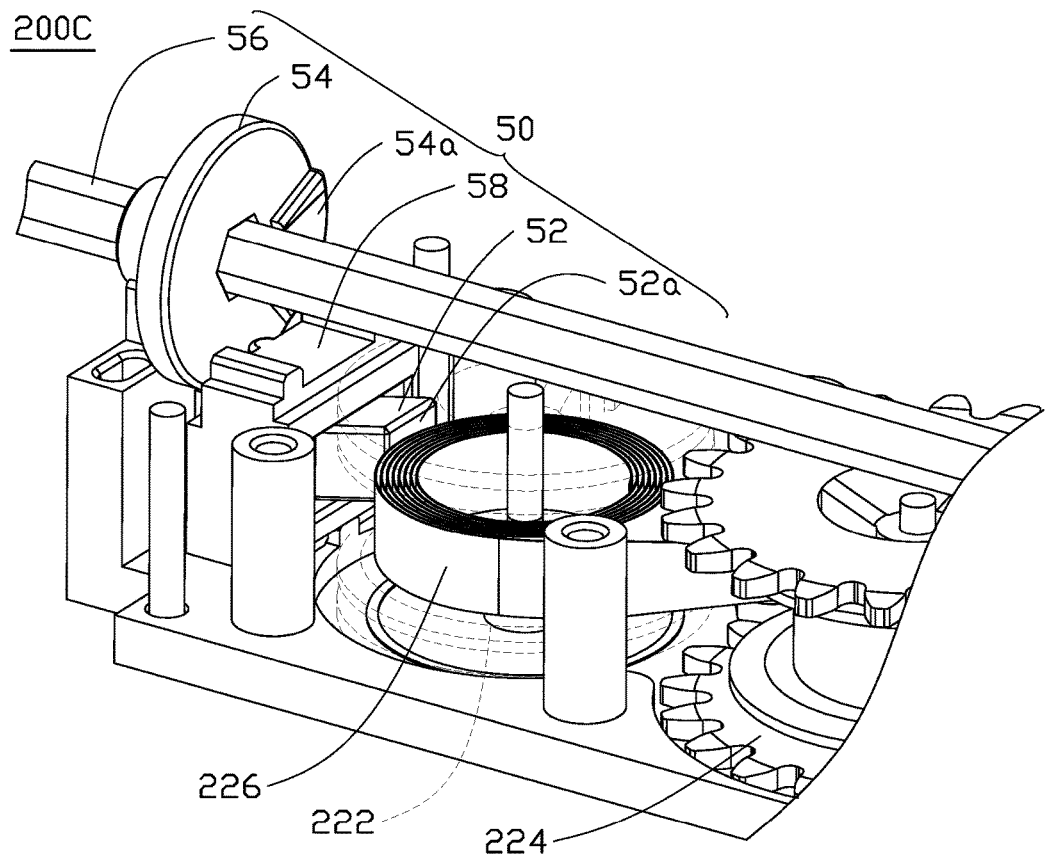
FIG. 10 is a perspective view of the speed control module in FIG. 9.
Figure 12:
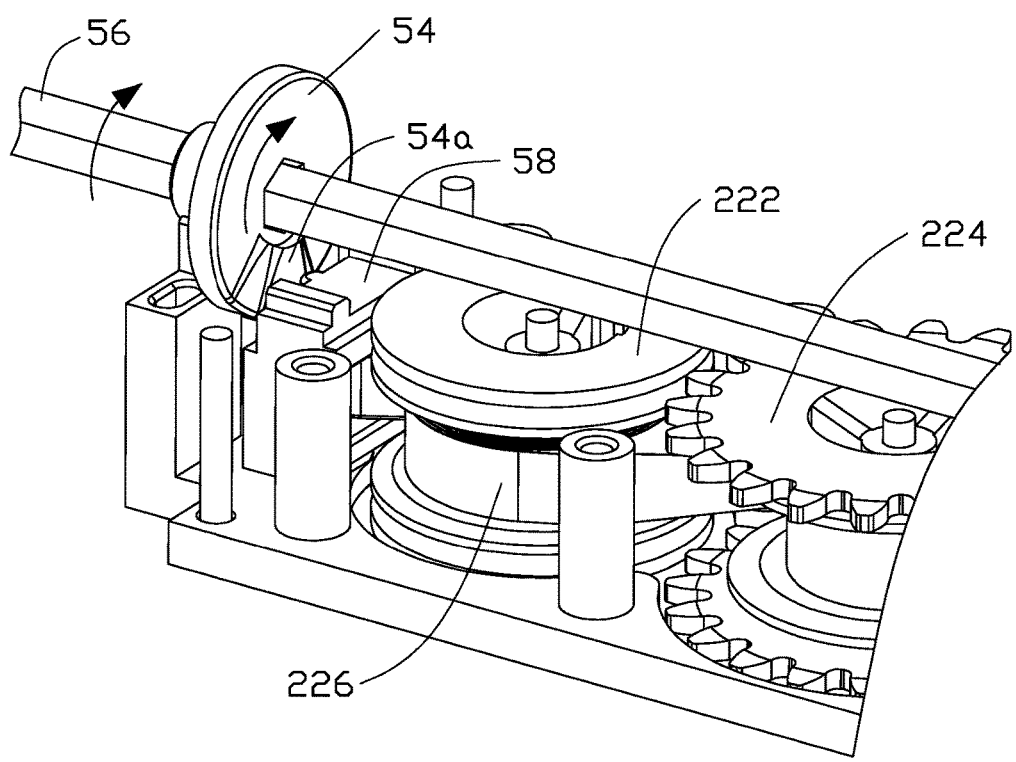
FIG. 12 is a perspective view of the speed control module in FIG. 11, wherein the speed control module is in operation.
Figure 13:
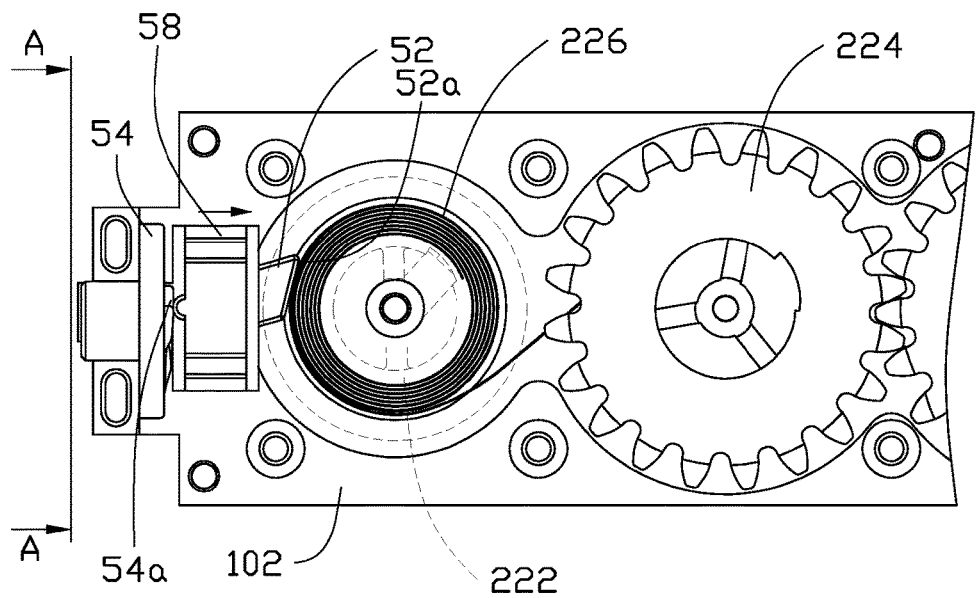
FIG. 13 is a schematic view of the speed control module in FIG. 11, wherein a sliding unit of the speed control module is in operation.
Figure 14:
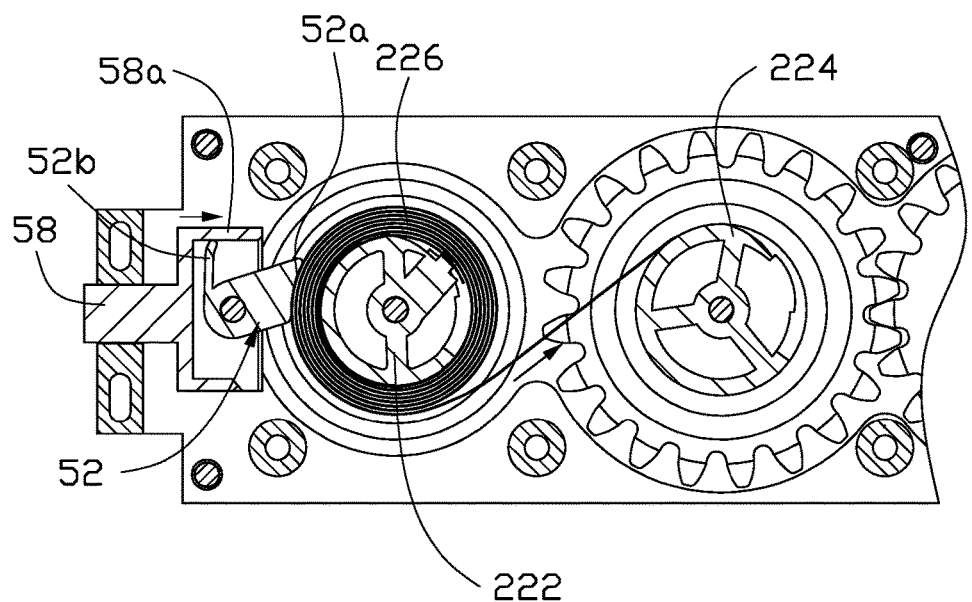
FIG. 14 is an A-A cross-sectional view of a friction member of the speed control module in FIG. 11.

Referring to FIG. 9 to FIG. 15, another embodiment of the speed control module of the window covering control assembly is disclosed. FIG. 9 is an exploded view of the speed control module of the window covering control assembly of the window covering system in FIG. 1 according to one embodiment of the present disclosure. FIG. 10 is a perspective view of the speed control module in FIG. 9. FIG. 11 to FIG. 15 disclose the operation relationship between the speed control module and resilient member. In one embodiment of the present disclosure, the speed control module 50 of the window covering control assembly 200C comprises a friction member 52 and an adjuster (not denoted in the figures) that is used to adjust the position of the friction member 52, wherein the adjuster comprises an abutting wheel 54, a connecting shaft 56, and a sliding unit 58. The sliding unit 58 is movably mounted on the shell 102 and configured to move along a protrusion rib 102a on the shell 102 (as shown in FIG. 9). The abutting wheel 54 is sleeved to the connecting shaft 56, wherein the abutting wheel 54 comprises an abutting structure 54a corresponding to the sliding unit 58 such that the abutting structure 54a can push the sliding unit 58 when the abutting wheel 54 is rotated. One end of the connecting shaft 56 is connected to a driving source (not shown in the figures) to drive the abutting wheel 54 to rotate for selectively pushing the sliding unit 58 to move. The friction member 52 is pivotally mounted in the sliding unit 58 to be pivoted by the sliding unit 58, wherein the friction member 52 pivots with respect to the sliding unit 58. The friction member 52 comprises a friction surface 52a and a biasing member 52b. The friction surface 52a is facing the resilient member 226 of the driving unit 22 (as shown in FIG. 14). The biasing member 52b is positioned corresponding to an inner side 58a of the sliding unit 58 such that the inner side 58a can push the biasing member 52b to pivot the friction member 52 when the sliding unit 58 moves.

Figure 11:
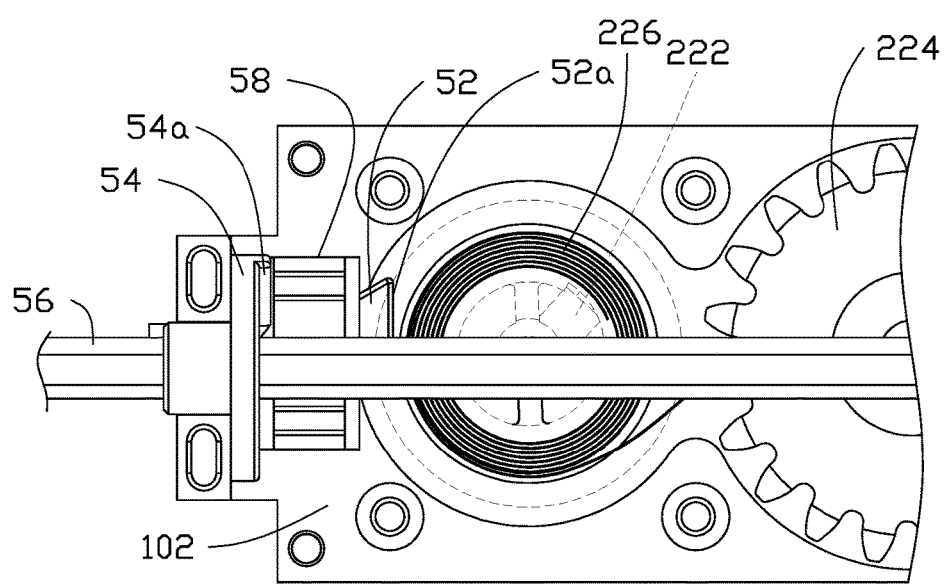
FIG. 11 is a top view of the speed control module in FIG. 10.
Figure 15:
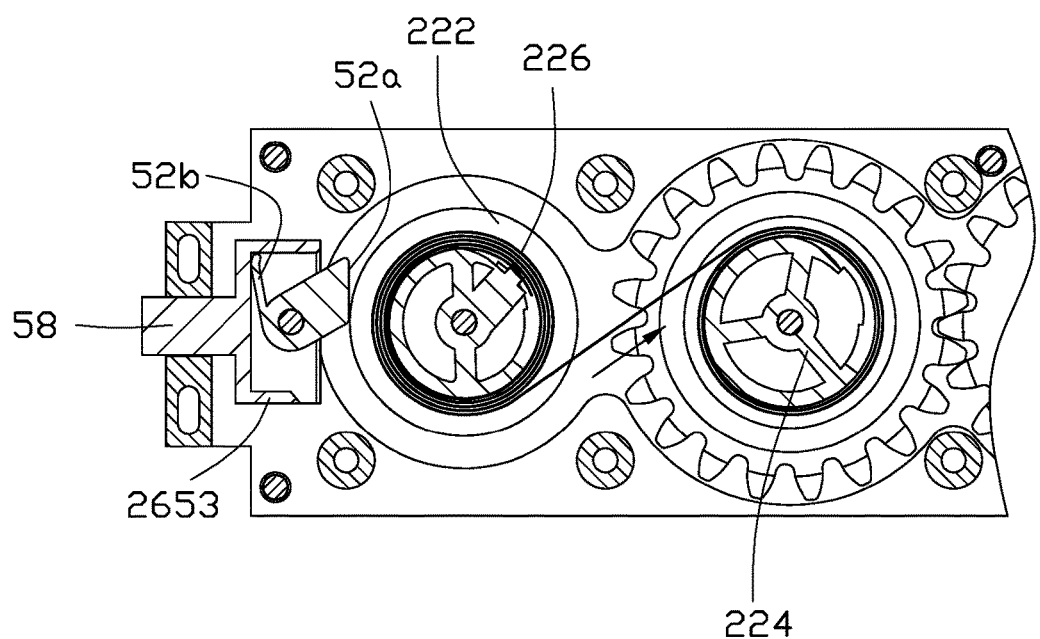
FIG. 15 is a schematic view of the speed control module in FIG. 11, wherein a resilient member of the speed control module in operation.

When the weight element 104 is moving toward the shell 102 such that the covering material 106 is collected, the resilient member 226 gradually returns to the initial state, and thus the resilient member 226 unwinds from the driving wheel 224 and winds around the storing wheel 222, whereby the winding diameter of the resilient member 226 around the storing wheel 222 is increased. Meanwhile, the sliding unit 58 is not pushed by the abutting wheel 54 and located at a position away from the storing wheel 222, and thus the friction member 52 is not in contact with the resilient member 226 (as shown in FIG. 11). Therefore, the operation of the resilient member 226 is not affected by the friction member 52, and the cord collecting assembly 24 operates smoothly to collect the lifting cord 1063. Referring to FIG. 12 to FIG. 14, while the covering material 106 is expanded, the first driving force is greater than the second driving force, and therefore the weight element 104 descends away from the shell 102 and the covering material 106 expands due to the weight of the weight element 104 and the covering material 106. Meanwhile, rotation of the connecting shaft 56 can drive the abutting wheel 54 to rotate, and thus the abutting structure 54a pushes the sliding unit 58 to move toward the resilient member 226, whereby the friction surface 52a of the friction member 52 abuts against the resilient member 226 to generate friction force. At the same time, the friction member 52 is pivoted in a direction opposite to the rotating direction of the resilient member 226 while abutting the resilient member 226, wherein the biasing member 52b of the friction member 52 is driven to abut against the inner side 58a of the sliding unit 58 such that limits the pivoting angle of the friction member 52 in order to keep the friction surface 52a of the friction member 52 abutting against the resilient member 226 to maintain the generation of the friction force. Therefore, the resistance force is provided to reduce the rotating speed of the resilient member 226, and hence reducing the operation speed of the driving unit 22 and the cord collecting assembly 24, as well as the expanding speed of the covering material 106 is reduced. During the expansion of the covering material 106, the winding diameter of the resilient member 226 around the storing wheel 222 is reduced gradually until the friction surface 52a of the friction member 52 is not in contact with the resilient member 226 (as shown in FIG. 15), and hence the resistance force is not provided. Thus, the first driving force drives the cord collecting wheel 242 to continue rotating in the first direction to release the lifting cord 1063 without interference of the resistance force. In one embodiment of the present disclosure, the resilient member 226 is a spiral spring.

As the covering material 106 expanding, the weight element 104 descends away from the shell 102, and the slats 1061 accumulated on the weight element 104 become less, thereby the first driving force decreases. When the first driving force decreases until the first driving force is equal to or less than a sum of the second driving force and the resistance force, the weight element 104 may stop descending due to all force acting upon the window covering system 100 is balanced, and thus the covering material 106 may not be fully expanded. To avoid such situation with the configuration described in the above-mentioned embodiments, advance calculation regarding the winding diameter of the resilient member 226 with respect to the position of the weight element 104 away from the shell 102 can be used to determine a timing of the friction member 52 contacting or not contacting the resilient member 226. In other words, the friction member 52 does not contact the resilient member 226 when the winding diameter of the resilient member 226 reaches a predetermined value, therefore variation of the predetermined value of the winding diameter can determine a position of the weight element 104 where generation of the resistance force is stopped. In such way, the expanding speed of the covering material 106 can be controlled, and therefore the weight element 104 can descend to a position that is furthest away from the shell 102 in order to expand the covering material 106 completely.

Figure 16:
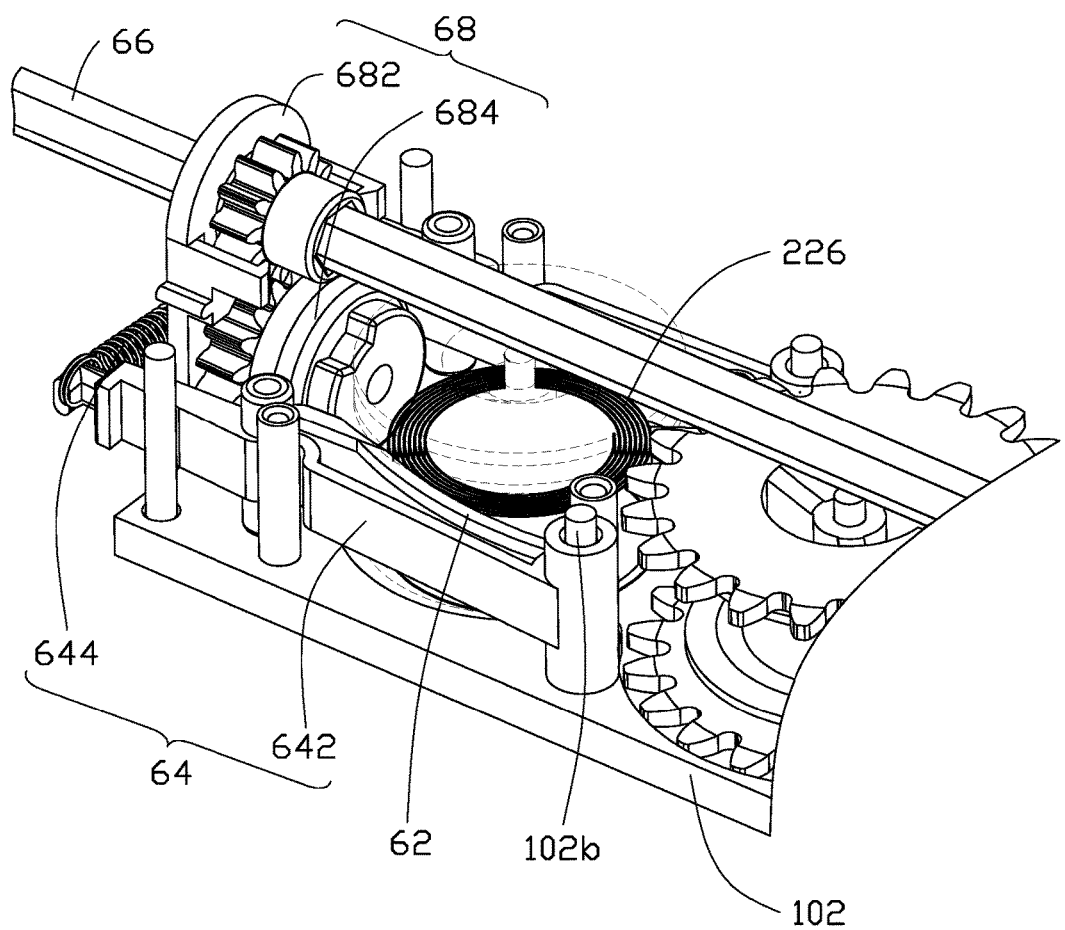
FIG. 16 is a perspective view of a speed control module of the window covering control assembly of the window covering system in FIG. 1 according to another embodiment of the present disclosure.
Figure 17:
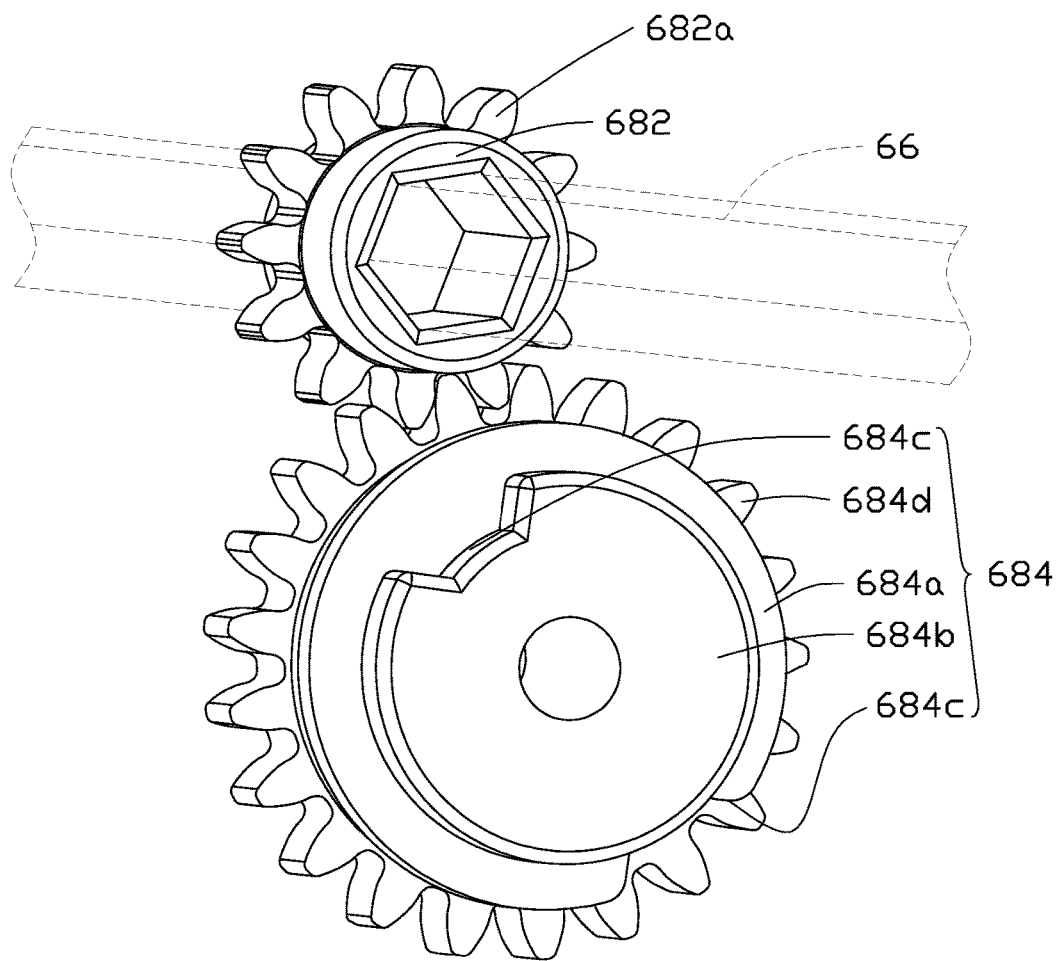
FIG. 17 is a perspective view of a separating member of the speed control module in FIG. 16.
Figure 18:
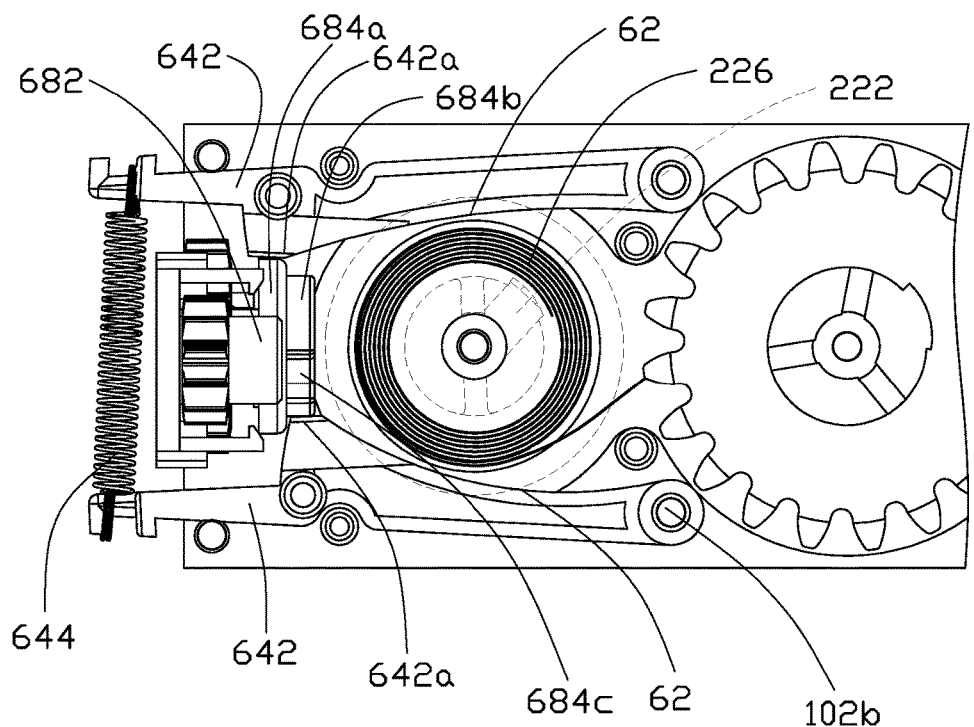
FIG. 18 is a top view of the speed control module in FIG. 16.
Figure 19:
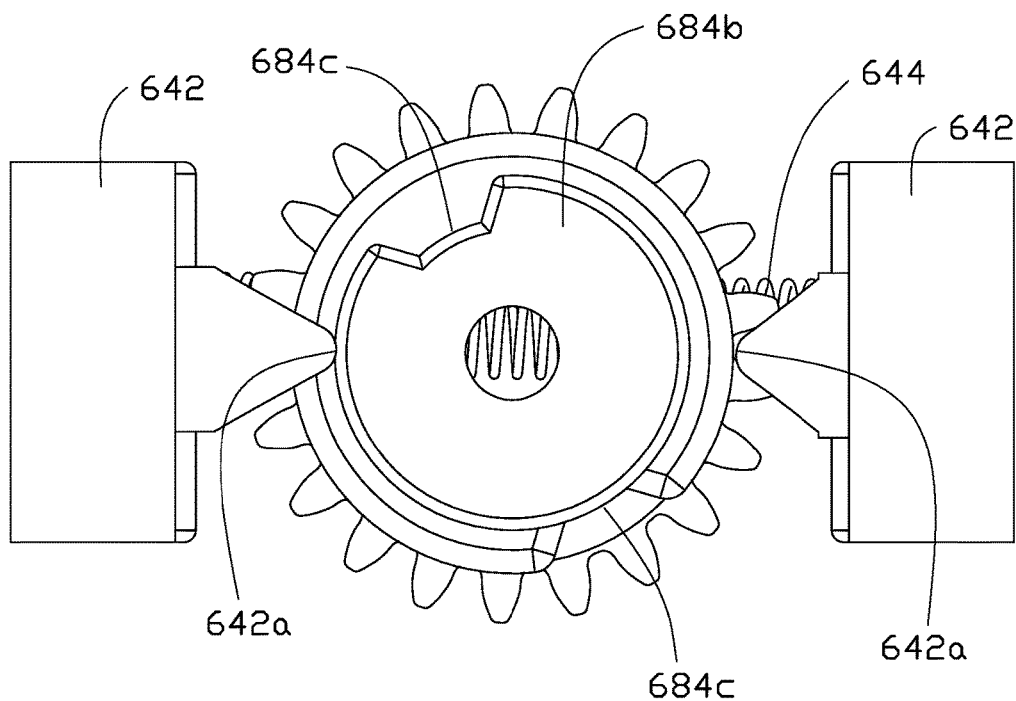
FIG. 19 is a schematic view of the speed control module in FIG. 16, wherein a concave structure of the separating member is defined corresponding to a clamping end of the clamping arm.
Figure 20:
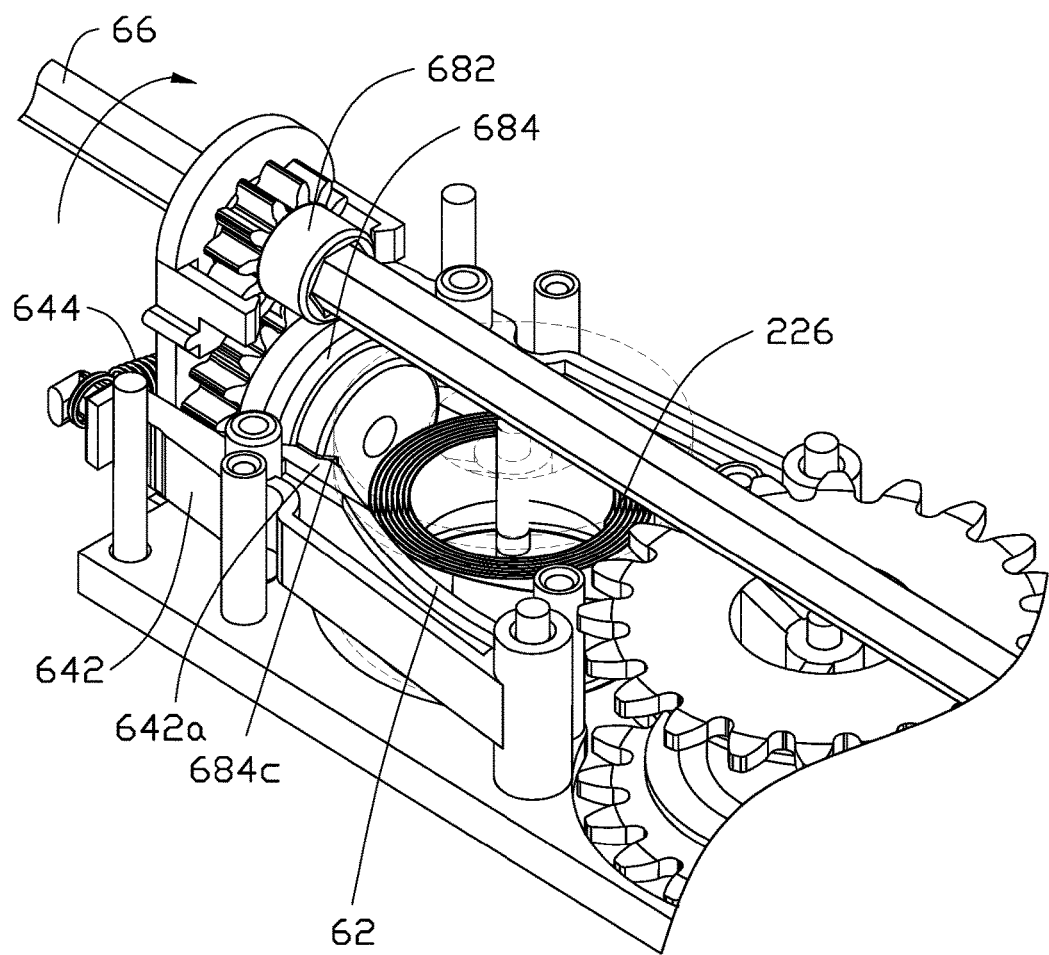
FIG. 20 is a perspective view of the speed control module in FIG. 16, wherein the speed control module is in operation.

Referring to FIG. 16 to FIG. 24, another embodiment of the speed control module of the window covering control assembly is disclosed. FIG. 16 is a perspective view of a speed control module of the window covering control assembly of the window covering system in FIG. 1 according to one embodiment of the present disclosure. FIG. 17 is a perspective view of a clamping member in FIG. 16. FIG. 18 is a top view of the clamping member in FIG. 16. FIG. 19 to FIG. 24 disclose the operation relationship between the speed control module and the resilient member. The speed control module 60 of the window covering control assembly 200D according to one embodiment of the present disclosure comprises a friction member 62 and an adjuster (not denoted in the figures) used to adjust the position of the friction member 62. The adjuster comprises a clamping member 64, a connecting shaft 66, and a separating member 68. The clamping member 64 comprises at least one clamping arm 642 corresponding to the resilient member 226 of the driving unit 22 such that the at least one clamping arm 642 can be in contact with the resilient member 226 when the clamping member 64 is operated by the separating member 68. One end of the clamping arm 642 is pivotally mounted to the shell 102 by a pillar 102b of the shell 102, wherein the pillar 102b is a pivoting axis of the clamping arm 642. A contracting member 644 is provided on the other end of the clamping arm 642 to urge the clamping arm 642 pivoting toward the resilient member 226 constantly. In one embodiment of the present disclosure, a pair of the clamping arm 642 is provided around the resilient member 226 such that the resilient member 226 is between the two clamping arms 642. Two pillars 102b are positioned with respect to the two clamping arms 642 such that each clamping arm 642 has an end rotatably sleeved to one of the corresponding pillar 102b to pivot with respect to the shell 102. The contracting member 644 is a coil spring between the other ends of the clamping arms 642. In such way, the clamping arms 642 are urged toward the resilient member 226 constantly. The friction member 62 is provided on one side of the clamping arm 642, wherein the side of the clamping arm 642 faces to the resilient member 226, and thereby the friction member 62 can selectively contacts the resilient member 226 to generate friction force according to the position of the clamping arm 642. The separating member 68 defines a distance between the clamping arm 642 and center of the resilient member 226, and variation of the distance causes the friction member 62 being in contact with the resilient member 226 to generate the resistance force.

The separating member 68 comprises a connecting wheel 682 and a stepped wheel 684, wherein the connecting wheel 682 is sleeved to the connecting shaft 66 and has a first teeth structure 682a. One end of the connecting shaft 66 is connected to a driving source (not shown in the figures) for driving the connecting wheel 682 to rotate. The stepped wheel 684 is positioned corresponding to the clamping arm 642 and the resilient member 226 such that the stepped wheel 684 can pivot the clamping arm 642 to contact the resilient member 226. The stepped wheel 684 comprises a first disc 684a and a second disc 684b. The diameter of the second disc 684b is less than the diameter of the first disc 684a. The second disc 684b is provided on one side of the first disc 684a, wherein the side of the first disc 684a faces to the resilient member 226. The second disc 684b comprises at least one concave structure 684c which extends from the circumference toward the center of the second disc 684b (in one embodiment of the present disclosure, two symmetric concave structures 684c are provided). The concave structure 684c is positioned corresponding to a clamping end 642a of the clamping arm 642 such that the clamping end 642a can be received in the concave structure 684c for pivoting the clamping arm 642. A second teeth structure 684d is provided on the edge of the first disc 684a corresponding to the first teeth structure 682a of the connecting wheel 682, wherein the connecting wheel 682 is configured to move simultaneously with the stepped wheel 684 by a toothed engagement between the first teeth structure 682a and the second teeth structure 684d.

Figure 21:
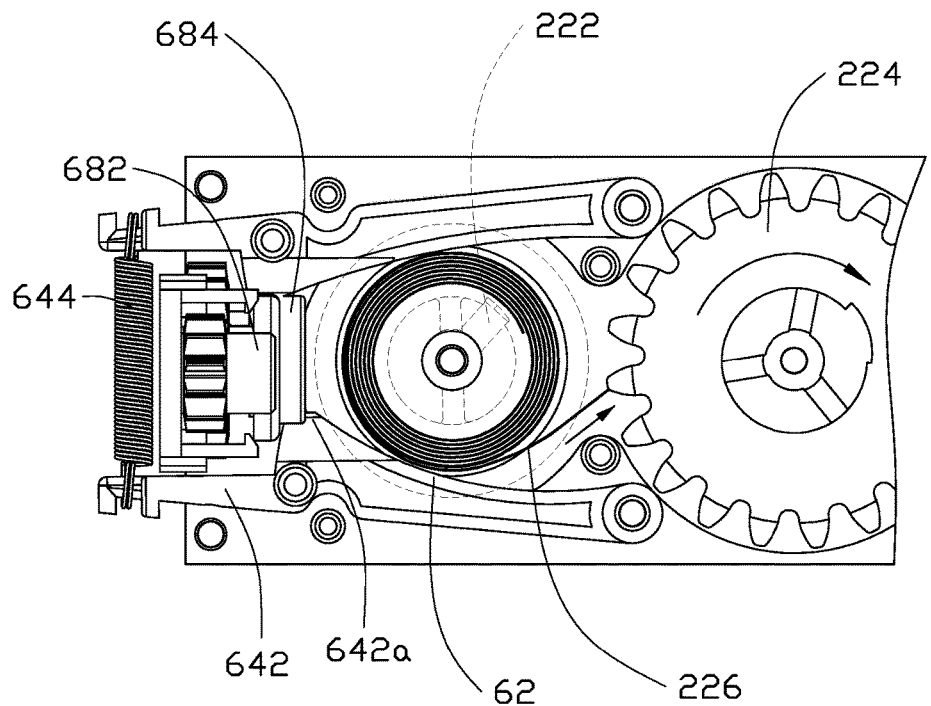
FIG. 21 is a schematic view of the speed control module in FIG. 16, wherein a resilient member of the speed control module is in operation.
Figure 22:
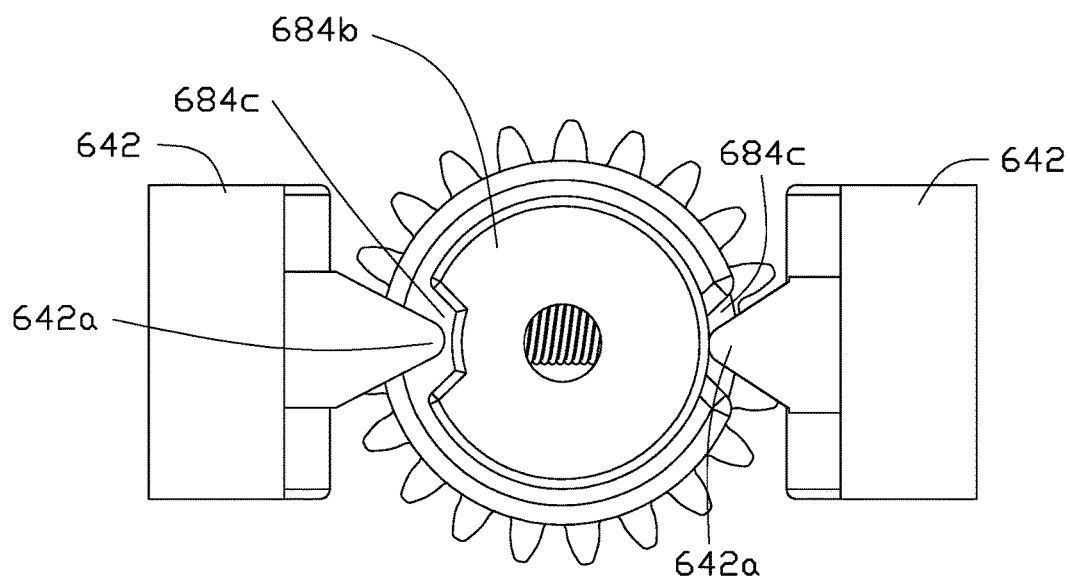
FIG. 22 is a schematic view of the speed control module in FIG. 16, wherein the clamping end of the clamping arm is within the concave structure of the separating member in operation.
Figure 23:
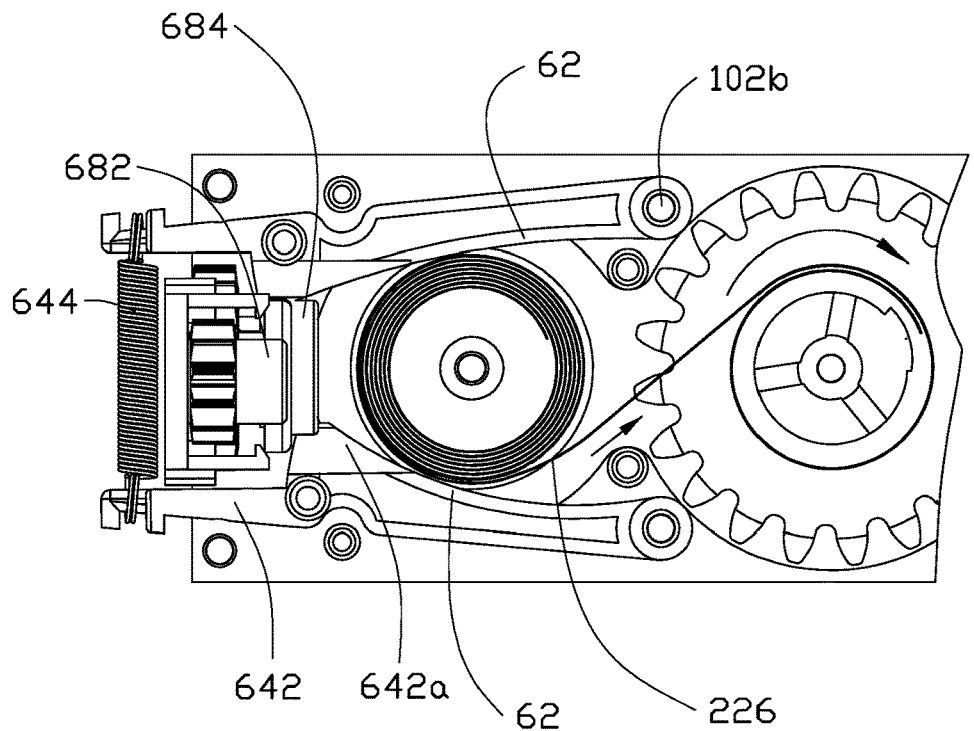
FIG. 23 is a schematic view of the speed control module in FIG. 16, wherein a friction member of the speed control unit is in contact with the resilient member in operation.
Figure 24:
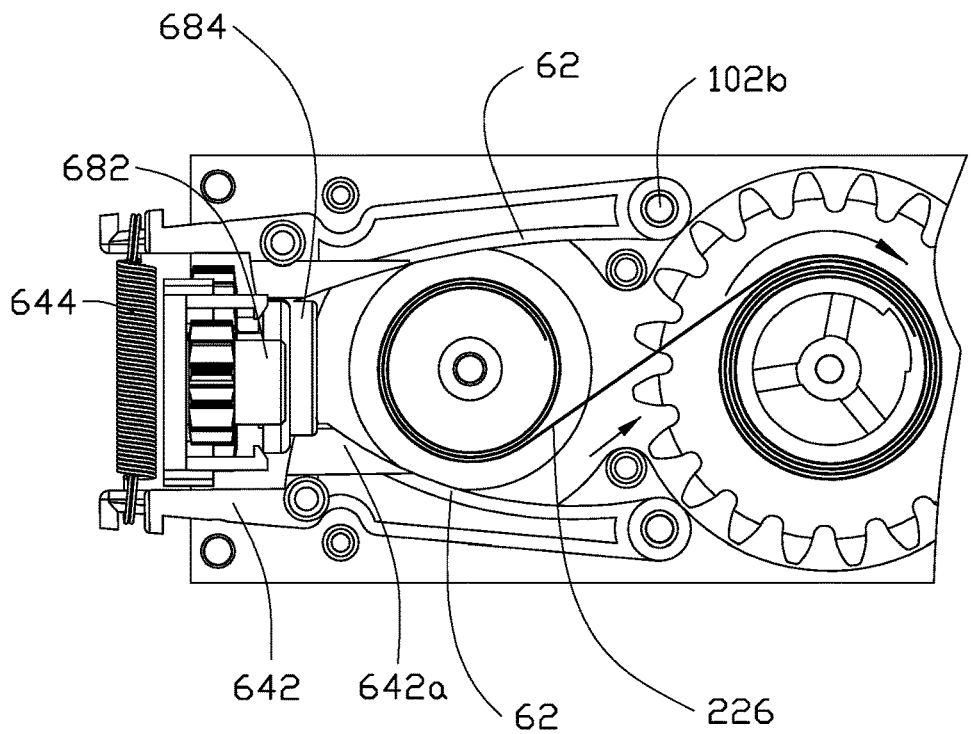
FIG. 24 is a schematic view of the speed control module in FIG. 23, wherein the friction member of the speed control unit is not in contact with the resilient member in operation.
Figure 25:
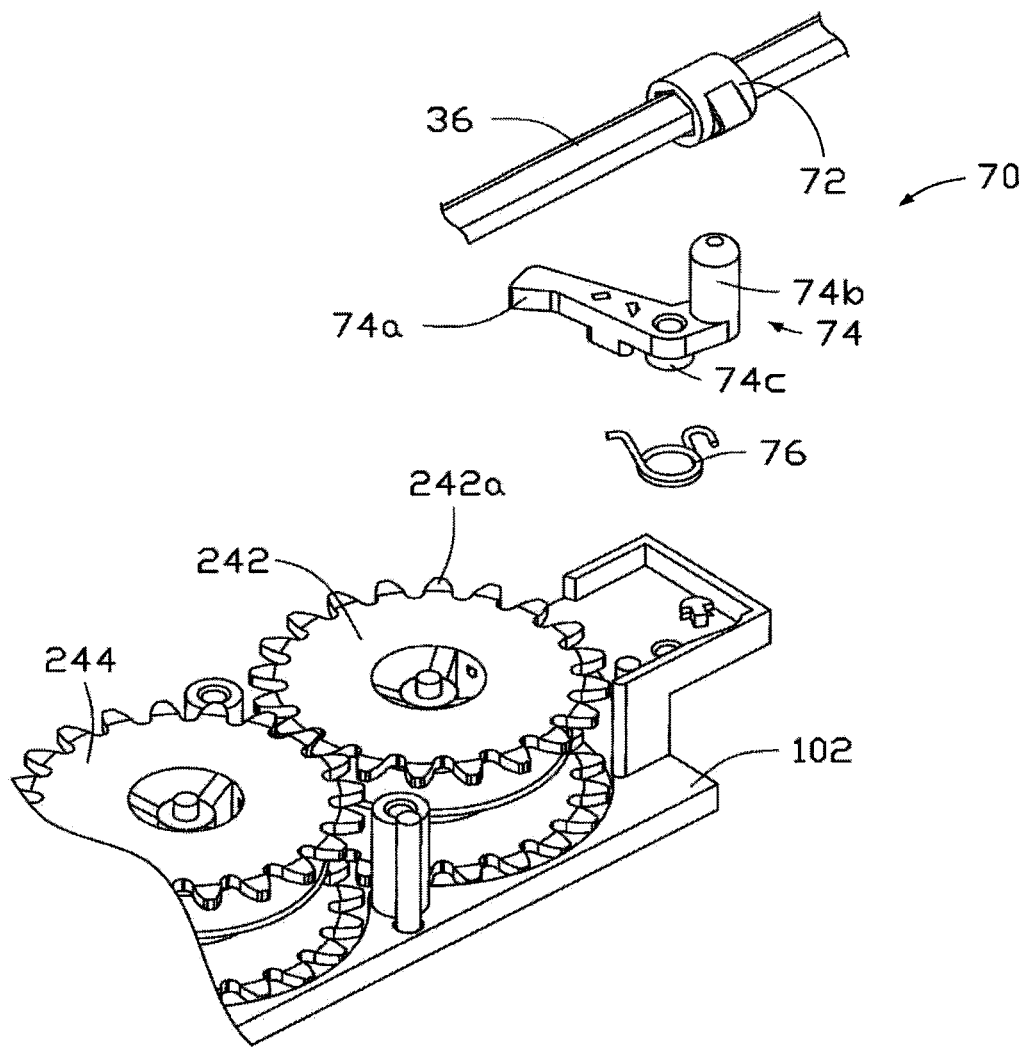
FIG. 25 is a perspective view of the window covering control assembly of the window covering system in FIG. 1 according to one embodiment of the present disclosure, wherein the window covering control assembly is in connection with a releasing module.

The operation relationship is further described hereafter according to one embodiment of the present disclosure. While the weight element 104 is ascending toward the shell 102, the connecting shaft 66 can be rotated to drive the connecting wheel 682 and the stepped wheel 684 to rotate such that the clamping end 642a of the clamping arm 642 is not received in the concave structure 684c of the second disc 684b, and thus a distance between the two clamping arms 642 is wider. Therefore, the friction member 62 is not contacting the resilient member 226 (as shown in FIG. 16 to FIG. 19) while the resilient member 226 unwinds from the driving wheel 224 and winds around the storing wheel 222, thereby the resistance force is not generated. Thus, the resilient member 226 can wind around the storing wheel 222 smoothly. At the beginning of expanding the covering material 106, the resilient member 226 is in the initial state such that the resilient member 226 winds around the storing wheel 222 with the largest winding diameter. At the same time, the connecting shaft 66 can be rotated to drive the connecting wheel 682 and the stepped wheel 684 to rotate such that the clamping end 642a of the clamping arm 642 is received in the concave structure 684c of the second disc 684b, and thus the clamping arm 642 is urged to pivot toward the resilient member 226 by the contracting member 644. Therefore, the friction member 62 contacts the resilient member 226 to generate a friction force (as shown in FIG. 21 to FIG. 23) while the resilient member 226 unwinds from the rotating storing wheel 222 and winds to the driving wheel 224, thereby the resistance force due to the friction force is generated. Thus, the operating speed of the driving unit 22 and the cord collecting assembly 24 is reduced, as well as the expanding speed of the covering material 106 is reduced. During the expansion of the covering material 106, the winding diameter of the resilient member 226 around the storing wheel 222 is reduced gradually until the friction member 62 is not in contact with the resilient member 226 (as shown in FIG. 24), and hence the restriction force is not generated. Thus, the first driving force drives the cord collecting wheel 242 to continue rotating in the first direction to release the lifting cord 1063 without interference of the resistance force.

As the covering material 106 expanding, the first driving force decreases. In order to prevent the cover material 106 from incomplete expansion with the configuration disclosed in the above-mentioned embodiments, advance calculation regarding the winding diameter of the resilient member 226 with respect to the position of the weight element 104 away from the shell 102 can be used to determine a timing of the friction member 62 contacting or not contacting the resilient member 226 by varying the diameter of the second disc 684b of the stepped wheel 684 and the radial depth of the concave structure 684c. In such way, the expanding speed of the covering material 106 can be controlled, and therefore the weight element 104 can descend to a position that is furthest away from the shell 102 in order to expand the covering material 106 completely.

In the above-mentioned embodiments of the window covering system 100, in order to precisely position the weight element 104, the widow covering system 100 in FIG. 1 can further comprise a releasing module 70 which operates simultaneously with the window covering control assembly 200A (or any one of 200B, 200C, and 200D). Referring to FIG. 25 to FIG. 29, the releasing module 70 in connection with the window covering control assembly is disclosed according to one embodiment of the present disclosure. The releasing module 70 comprises an actuating wheel 72, a braking member 74, and a restoring member 76, wherein the actuating wheel 72 is sleeved to the connecting shaft 36 and configured to operate simultaneously with the speed control module (not shown in the figures). The actuating wheel 72 comprises an actuating protrusion 72a. The braking member 74 is shown as a braking pawl, wherein the braking member 74 comprises a pawl portion 74a, an operation portion 74b, and an axis portion 74c. The braking member 74 is pivotally mounted to the shell 102 by the axis portion 74c, wherein the axis portion 74c is a pivoting axis of the braking member 74. The pawl portion 74a is positioned corresponding to the second engaging gear 242a of the cord collecting wheel 242 of the window covering control assembly (not denoted in the figures) such that the pawl portion 74a can engage the second engaging gear 242a when the braking member 74 is not pivoted, but not limited thereto. As mentioned before, the driving unit 22 and the cord collecting assembly 24 are engaged by toothed engagement to operate simultaneously. Therefore, the pawl portion 74a can also be positioned corresponding to any wheels among the driving unit 22 or the cord collecting assembly 24 to achieve the same result. Alternatively, an additional wheel (not shown in the figures), which is engaged to the driving unit 22 or the cord collecting assembly 24 for simultaneous operation, can also be employed. The operation portion 74b is positioned corresponding to the actuating protrusion 72a of the actuating wheel 72 such that the operation portion 74b can be pushed by the actuating protrusion 72a when the actuating wheel 72 is rotated. The restoring member 76 is shown as a restoring spring, wherein the restoring member 76 is disposed between the braking member 74 and the shell 102 for providing a biasing force which urges the pawl portion 74a of the braking member 74 to pivot toward the window covering control assembly constantly.

Figure 26:
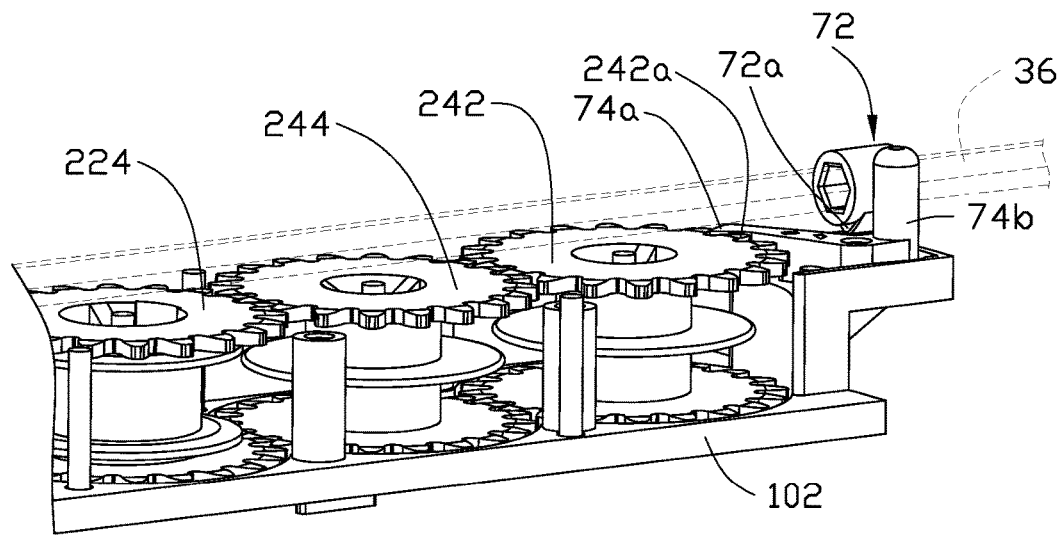
FIG. 26 is a perspective view of the window covering control assembly in FIG. 25, wherein the window covering control assembly is in connection with a releasing module.
Figure 27:
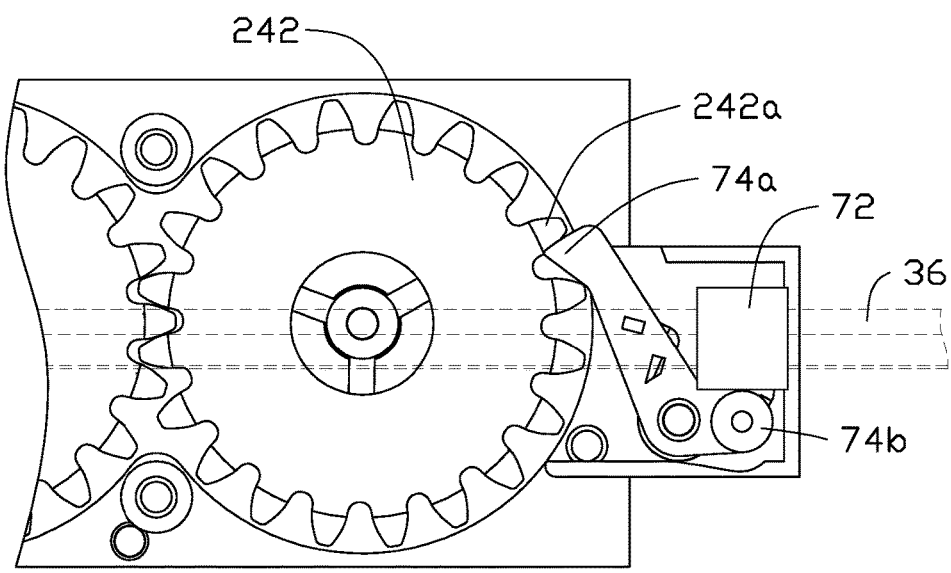
FIG. 27 is a top view of the window covering control assembly in FIG. 25, wherein the window covering control assembly is in connection with the releasing module.
Figure 28:
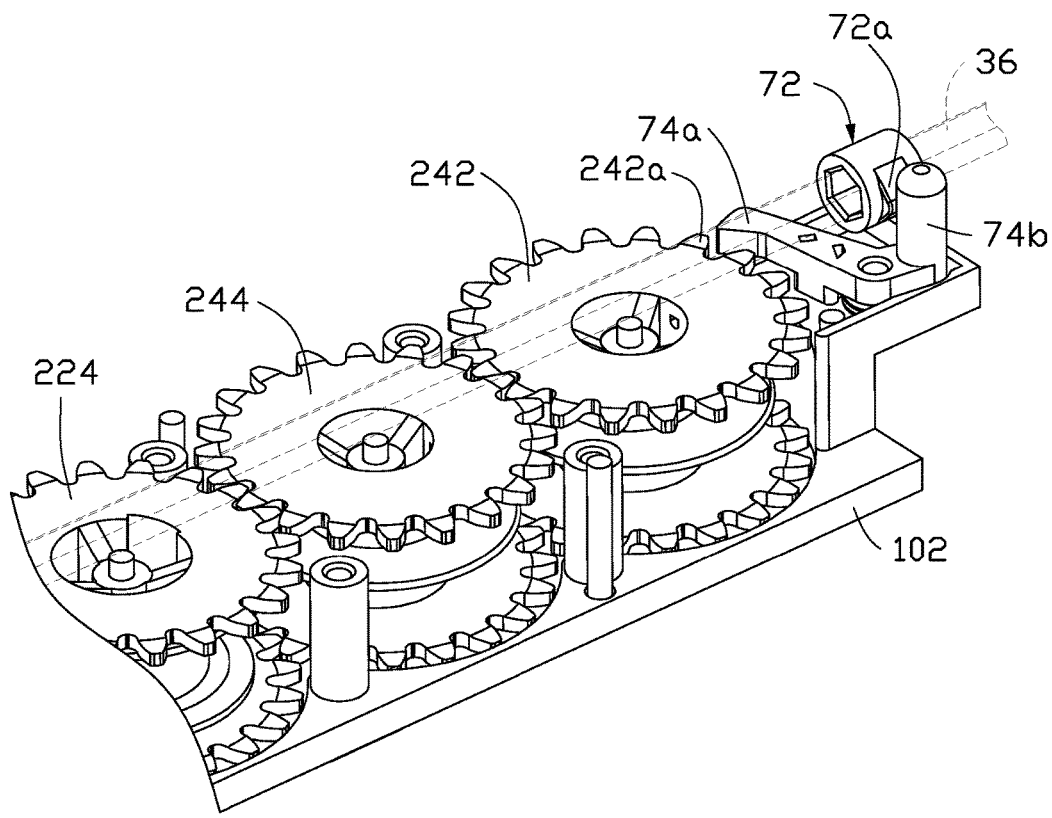
FIG. 28 is a perspective view of the window covering control assembly in FIG. 25, wherein the window covering control assembly is in connection with the releasing module in operation.
Figure 29:
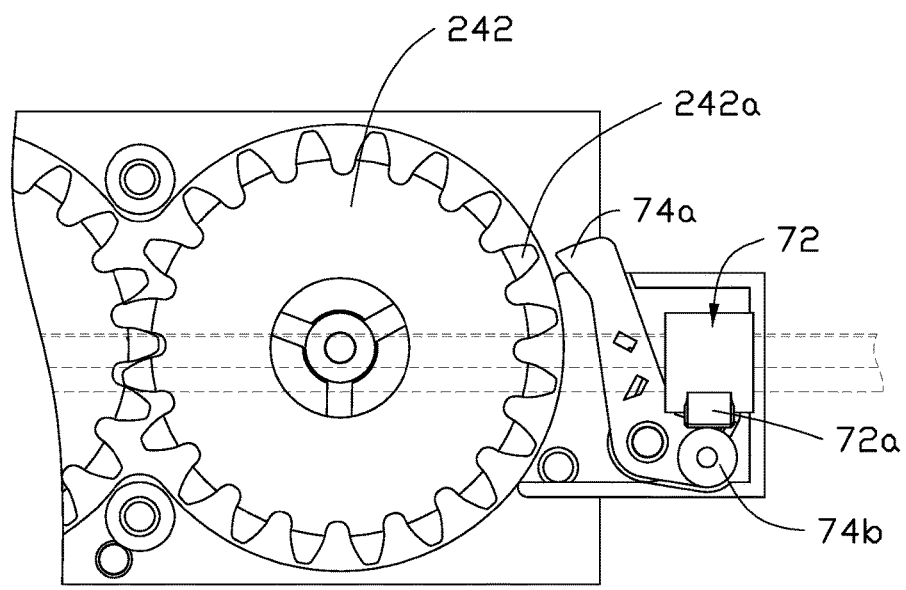
FIG. 29 is a schematic view of the window covering control assembly in FIG. 28, wherein the window covering control assembly is in connection with the releasing module in operation.

When the actuating wheel 72 is driven by the connecting shaft 36 such that the actuating protrusion 72a does not push the operation portion 74b of the braking member 74, the pawl portion 74a of the braking member 74 is urged by the biasing force of the restoring member 76 to pivot and abut against the second engaging gear 242a. Since one side of the pawl portion 74a corresponding to the second engaging gear 242a is an inclined surface, and the restoring member 76 is elastic, the braking member 74 can pivot back and forth with respect to the second engaging gear 242a. Therefore, the teeth of the second engaging gear 242a can one-way slide off the inclined surface of the pawl portion 74a of the braking member 74 (as shown in FIG. 26 and FIG. 27), and thus the cord collecting wheel 242 can rotate in the second direction to collect the lifting cord 1063, and hence the weight member 104 can be push upward by a user to collect the covering material 106 directly. On the other hand, when the cord collecting wheel 242 begins to rotate in the first direction, the teeth of the second engaging gear 242a are engaged to an end of the pawl portion 74a to inhibit the rotation of the cord collecting wheel 242 toward the first direction, thereby the lifting cord 1063 is not released from the cord collecting wheel 242. Therefore, the weight element 104 does not descend, and the covering material 106 is not expanded. In addition, the cord collecting wheel 242 is engaged to the other cord collecting wheel 244 and the driving unit 22 to rotate simultaneously. Thus, when the cord collecting wheel 242 is restricted to rotate in the first direction, the driving unit 22 is not rotating as well. However, when the actuating wheel 72 is driven by the connecting shaft 36 such that the actuating protrusion 72a pushes the operation portion 74b, the braking member 74 pivots to disengage the pawl portion 74a from the second engaging gear 242a (as shown in FIG. 28 and FIG. 29). Therefore, the cord collecting wheel 242 is not restricted by the pawl portion 74a such that the cord collecting wheel 242 can rotate freely. At this moment, the weight element 104 descends automatically to expand the covering material 106, since the first driving force is greater than the second driving force.

Therefore, the releasing module 70 is used as a switch for the window covering control assembly. Under the premise that the second driving force is less than the first driving force, users can ascend the weight element 104 upward and stop the weight element 104 at any desired position by using the one-way stop function of the braking member 74. Otherwise, when the cord collecting wheel 242 is freed from the restriction of the braking member 74, the weight element 104 is allowed to descend automatically, and the covering material 106 is expanded. Meanwhile, the releasing module 70 can connect with any one of the foregoing speed control units by any one of the foregoing connecting shafts. In other words, under a suitable configuration, when any one of the foregoing connecting shafts free the cord collecting wheel 242 from the restriction of the braking member 74, any one of the foregoing speed control units is simultaneously operated to reduce the expanding speed of the covering material 106, and therefore reducing the risk of accident or component damage that is caused by quick dropping of the weight element 104.

Figure 30:
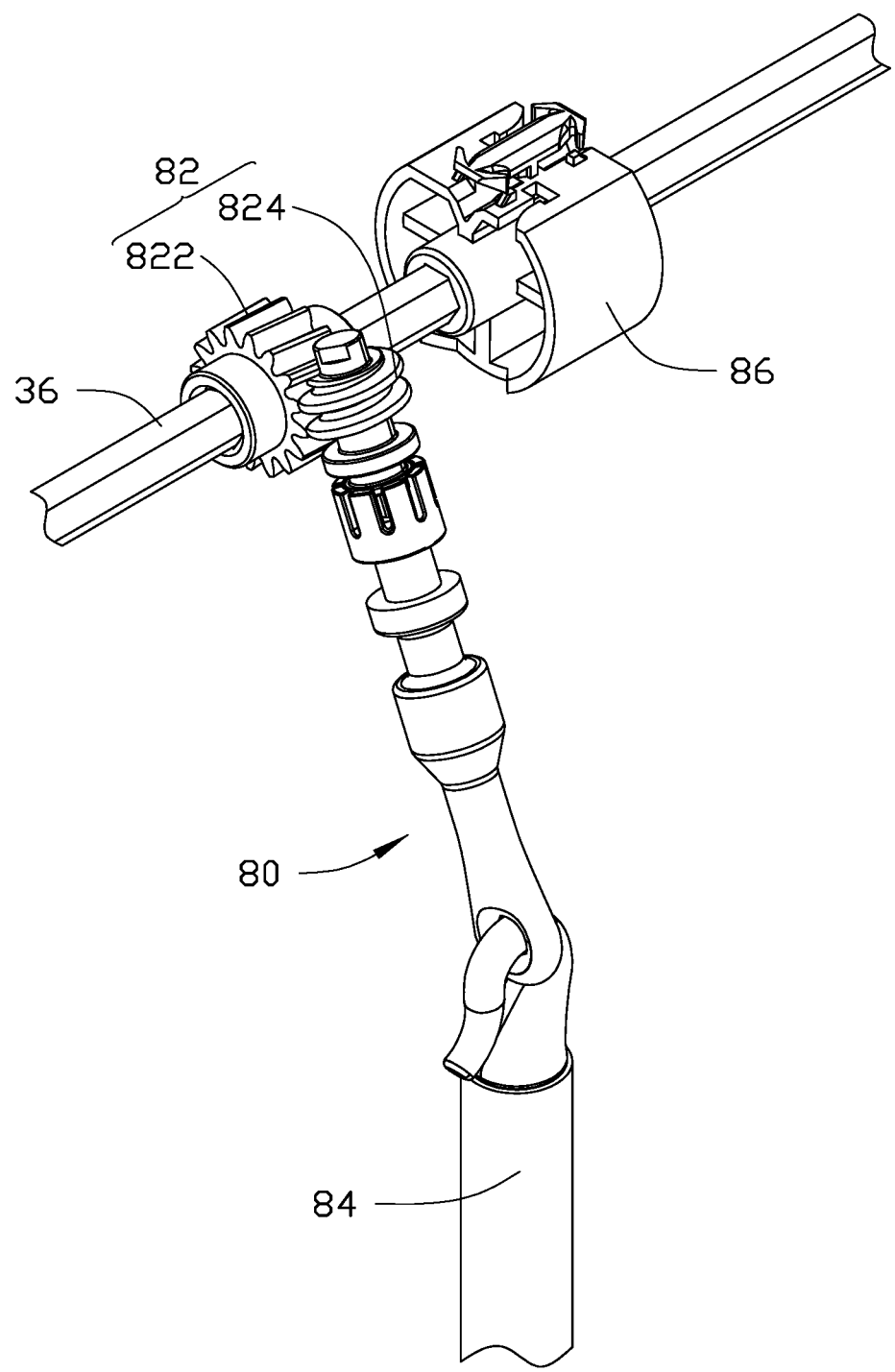
FIG. 30 is a perspective view of a slat adjusting module of the window covering control assembly of the window covering system in FIG. 1 according to one embodiment of the present disclosure.
Figure 31:
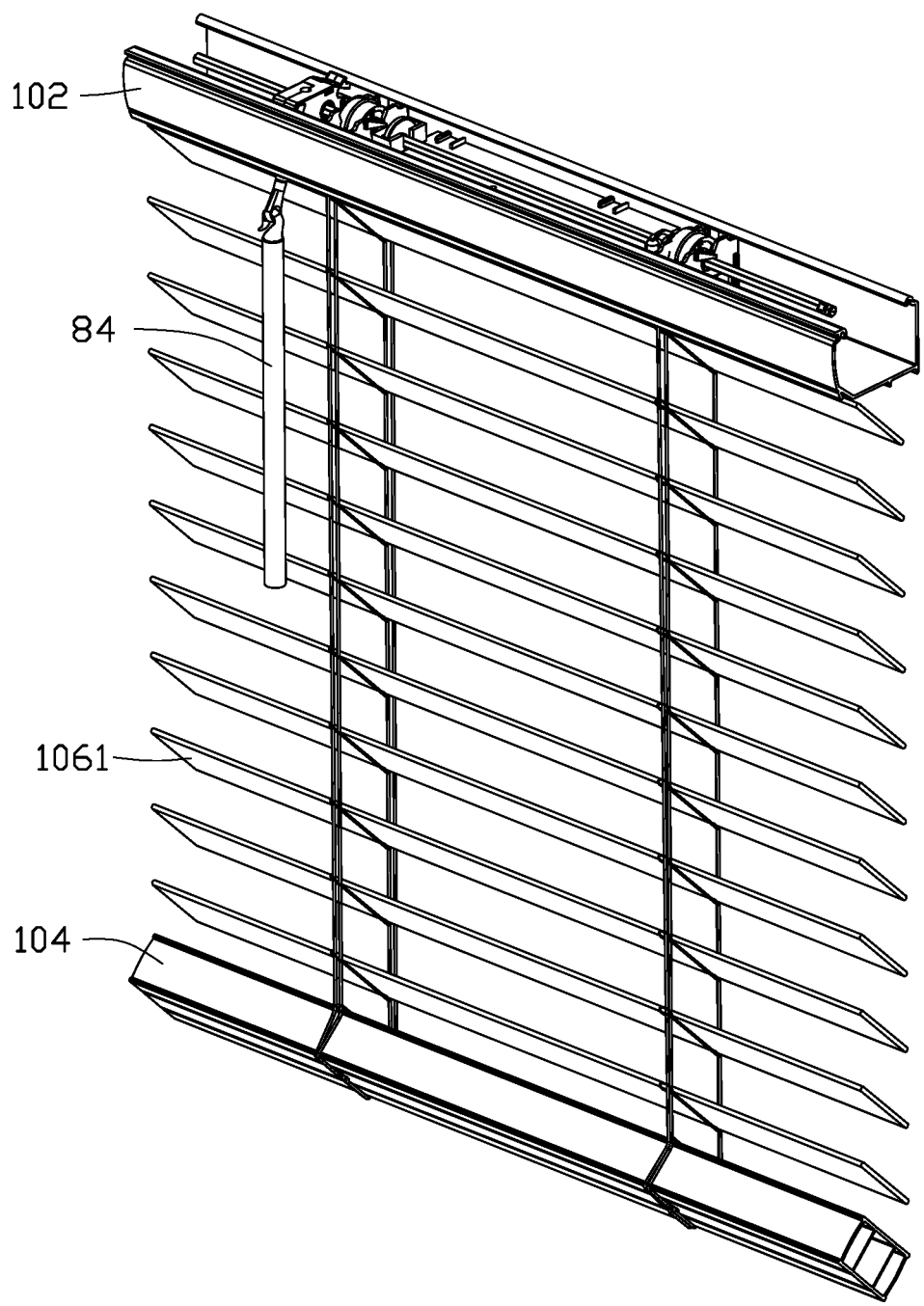
FIG. 31 is a perspective view of an operating member of the slat adjusting module in FIG. 30.

Besides, in the above-mentioned embodiments of various types of window covering system 100, in order to allow different users to operate the expansion of the covering material 106 smoothly, the window covering system 100 in FIG. 1 further comprises a slat adjusting module 80 engaged to the window covering control assembly 200A (or any one of 200B, 200C and 200D) to move simultaneously. Referring to FIG. 30 and FIG. 31, the window covering control assembly in connection with the slat adjusting module 80 is disclosed according to one embodiment of the present disclosure. The slat adjusting module 80 comprises a tilting unit 82, an operating member 84, and a slat adjusting wheel 86, wherein the tilting unit 82 and the slat adjusting wheel 86 are sleeved to the connecting shaft 36, and thus the tilting unit 82 drives the slat adjusting wheel 86 to rotate through the connecting shaft 36. The tilting unit 82 comprises a worm gear 822 and a worm 824 which are engaged to each other by toothed engagement. The worm gear 822 is sleeved to the connecting shaft 36, so that the connecting shaft 36 and the worm gear 822 rotate synchronously. The worm 824 is connected to the operating member 84 and hangs in front of the covering material 106 for users to operate (as shown in FIG. 1 and FIG. 31). In one embodiment of the present disclosure, the operating member 84 is shown as a stick.

The aforementioned adjusting string 1065 has a shape of ladder with a plurality of grids from a side view angle (as shown FIG. 2). Each slat 1061 is disposed in each grid of the adjusting string 1065. One end of the adjusting string 1065 is connected to the slat adjusting wheel 86 (as shown in FIG. 2), and the other end of the adjusting string 1065 is connected to the weight element 104. By rotating the operating member 84 connected to the worm 824, the worm 824 is rotated, thereby drives the worm gear 822 to rotate, and thus the connecting shaft 36 rotates, as well as the slat adjusting wheel 86 sleeved to the connecting shaft 36 rotates. Therefore, the adjusting string 1065 connected to the slat adjusting wheel 86 is operated to change an angle of the slats 1061, and hence adjusts the light transmittance of the covering material 106.

Figure 32:
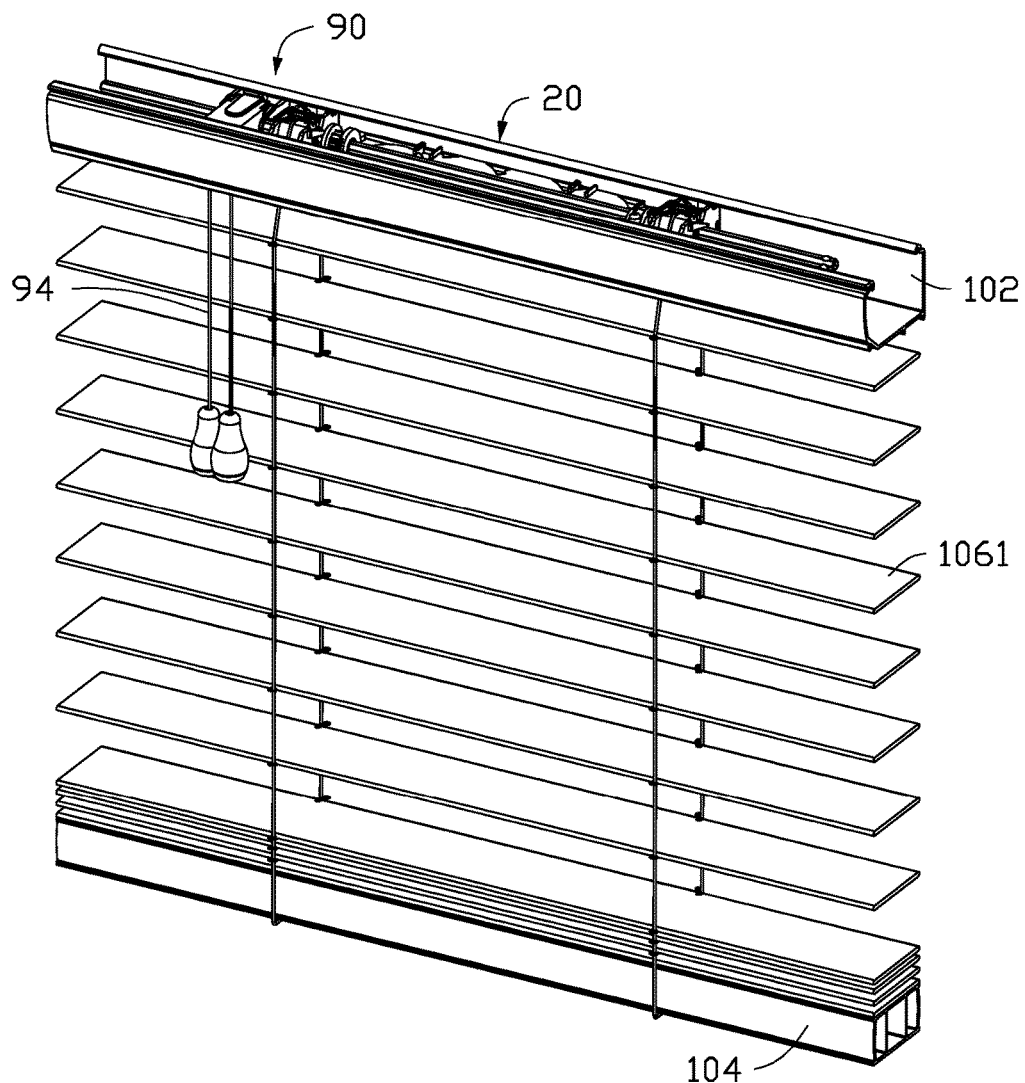
FIG. 32 is a perspective view of the operating member of the slat adjusting module in FIG. 31 according to another embodiment of the present disclosure.
Figure 33:
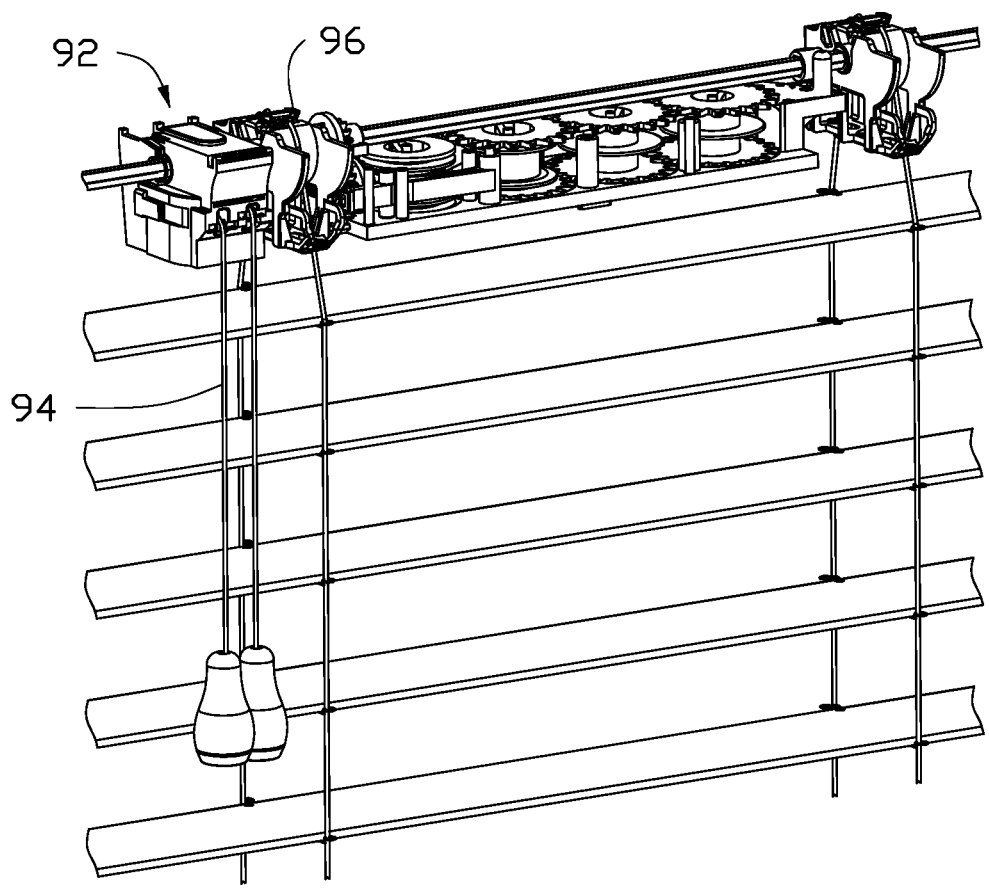
FIG. 33 is a perspective view of the operating member in FIG. 32.
Figure 34:
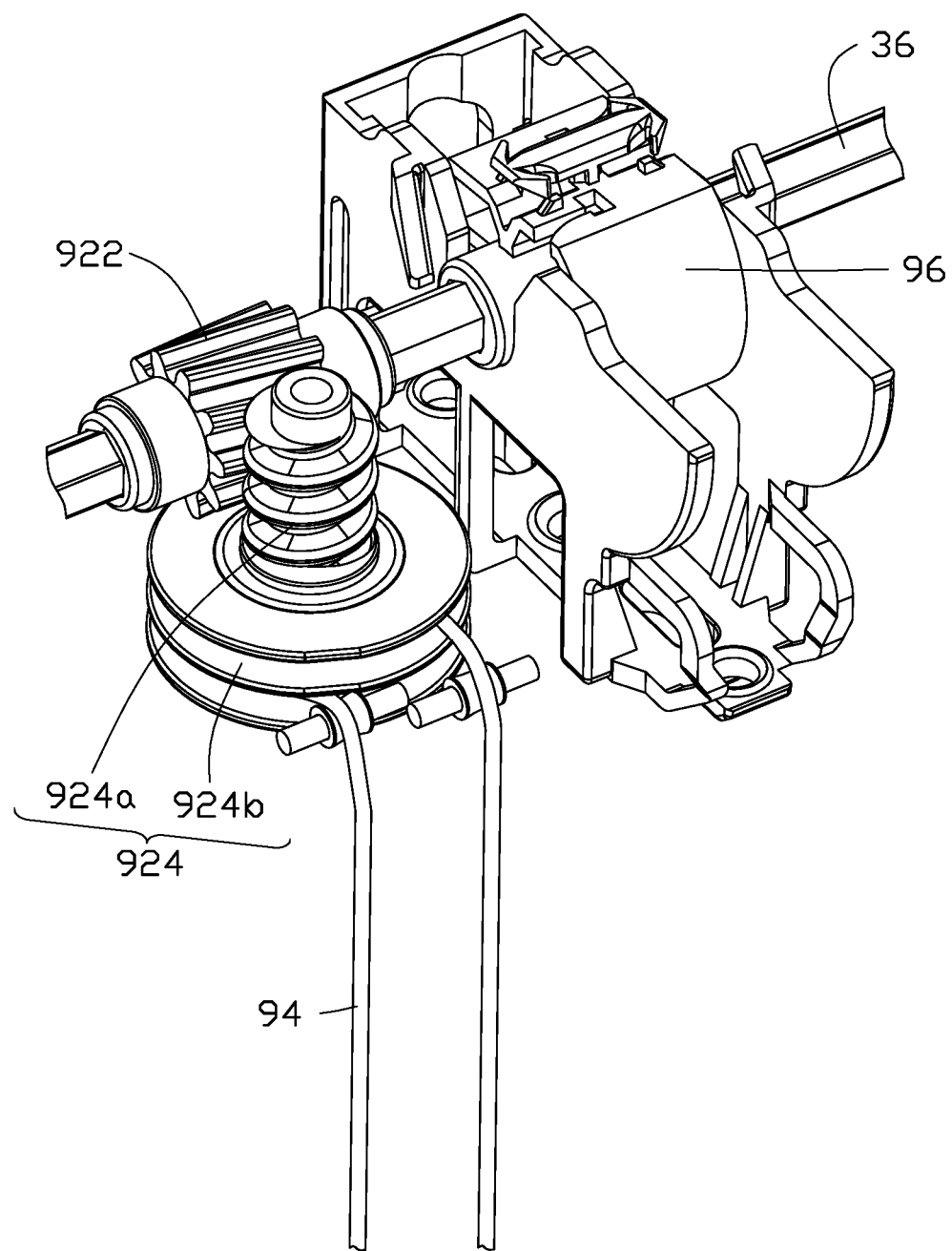
FIG. 34 is a perspective view of the slat adjusting module in FIG. 32.
Figure 35:
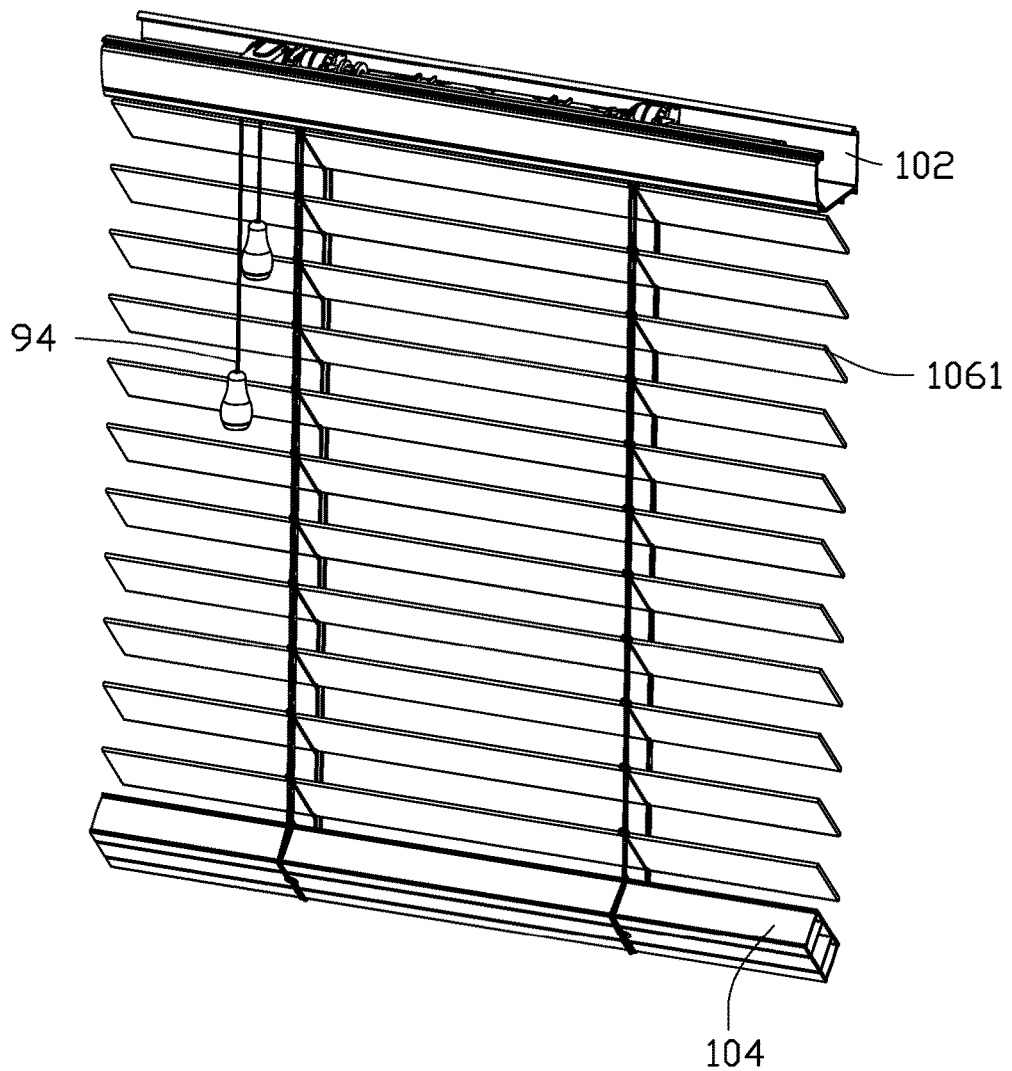
FIG. 35 is a perspective view of the operating member in FIG. 32, wherein the operating member is in operation.

In the previous embodiment, the operating member 84 of the slat adjusting module 80 is shown as a stick for users to operate. However, other types of operating member 84 can also be employed, such as a cord. Referring to FIG. 32 to FIG. 35, another embodiment of the slat adjusting module of the window covering system in FIG. 1 is disclosed. The slat adjusting module 90 comprises a tilting unit 92, an operating member 94, and a slat adjusting wheel 96. The tilting unit 92 and the slat adjusting wheel 96 are sleeved to the connecting shaft 36, and thus the tilting unit 92 and the slat adjusting wheel 96 operate synchronously by operating the connecting shaft 36. The tilting unit 92 comprises a worm gear 922 and a worm assembly 924 which are engaged to each other by toothed engagement. The worm gear 922 is sleeved to the connecting shaft 36, wherein the worm assembly 924 comprises a worm 924*a* and a dividing plate 924*b*, wherein the worm 924*a* and the worm gear 922 are engaged to each other by toothed engagement. The operating member 94 is shown as a slat adjusting cord, wherein the operating member 94 is placed around the dividing plate 924*b*, and two ends of the operating member 94 are hanged freely in front of the covering material 106 for operating (as shown in FIG. 32). One end of the adjusting string 1065 is connected to the slat adjusting wheel 96, and the other end is connected to the weight element 104. By pulling one of the free ends of the operating member 94 that is shown as the slat adjusting cord, the worm 924*a* is rotated to drive the worm gear 922 to rotate. At the same time, the connecting shaft 36 and the slat adjusting wheel 96 are rotated as well, and thus a tilting angle of the slats 1061 is changed (as shown in FIG. 35).

By the configuration of any one of the foregoing slat adjusting modules, the slat adjusting module can be used as the driving source of any one of the foregoing connecting shafts. By connection between the releasing module 70 and any one of the foregoing speed control modules using any one of the foregoing connecting shafts, not only the weight element 104 can be precisely positioned, but also the problem of inconvenience due to different operable heights of the weight element 104 according to different users can be solved by using the operating member 84 of the slat adjusting module 80 to operate the releasing module 70 and any one of the foregoing speed control modules. Therefore, the weight element 104 can be easily operated to descend, and thus the covering material 106 is expanded slowly.

It will be apparent to those skilled in the art that the present disclosure is not limited to the details of the foregoing exemplary embodiments, and that the disclosure may be realized in any other specific forms without departing from the spirit or essential characteristics of the present disclosure. Therefore, all the aforementioned embodiments should only be considered as illustrative and not restrictive in all aspects. The scope of the disclosure is defined by the claims rather than by the foregoing descriptions, and therefore the scope of the disclosure is intended to cover any changes within equivalent meaning and range thereof. Any numbering in the claims shall not be construed as limiting the claims. Furthermore, "comprise" does not exclude other elements or steps, and the singular does not exclude a plurality. The plurality of units or means recited in the system claims may also be realized by software or hardware from a unit or device.

What is claimed is:

1. A window covering control assembly for a window covering system, the window covering system comprises a shell and a weight element under the shell, wherein the weight element is operatively configured to ascend close to or descend away from the shell, the window covering control assembly comprises:
  a driving module, which is adapted to be provided in the shell and engaged to the weight element to operate simultaneously with the weight element, wherein the driving module comprises a cord collecting assembly, which is adapted to be mounted in the shell; the cord collecting assembly is configured to operate in a first direction while a first driving force acts upon the cord collecting assembly; when the cord collecting assembly is mounted in the shell and when the weight element descends away from the shell, the first driving force at least comprises a weight of the weight element; and
  a speed control module positioned corresponding to the driving module, wherein a resistance force is selectively generated between the speed control module and the driving module, and wherein an operation speed of the cord collecting assembly in the first direction is reduced when the resistance force is generated between the speed control module and the driving module.

2. The window covering control assembly of claim 1, wherein the cord collecting assembly comprises a cord collecting wheel; the resistance force is a friction force; the speed control module comprises a friction member, the friction member is positioned corresponding to the cord collecting wheel; while the cord collecting wheel is rotating in the first direction, the friction member provides the friction force to the driving module to reduce the rotating speed of the cord collecting wheel.

3. The window covering control assembly of claim 2, wherein the friction member is a restriction spring which comprises two ends and a diameter, wherein one end of the restriction spring is fixed to the shell, and the other end of the restriction spring is a free end; the diameter of the restriction spring is changed when a position of the free end is changed.

4. The window covering control assembly of claim 3, wherein the speed control module further comprises a connecting shaft, an abutting member and a one-way clutch, wherein the abutting member is sleeved to the connecting shaft and positioned corresponding to the restriction spring, and the one-way clutch is positioned corresponding to the cord collecting wheel, and an outer case of the one-way clutch is coiled by the restriction spring; wherein the one-way clutch is configured to rotate with respect to the restriction spring when the connecting shaft drives the abutting member to push the free end of the restriction spring to increase the diameter of the restriction spring, and the cord collecting wheel is configured to rotate with the one-way clutch simultaneously such that the cord collecting wheel rotates in the first direction, and the restriction spring is in contact with the outer case of the one-way clutch to generate the restriction force to reduce the rotating speed of the one-way clutch and the cord collecting wheel; wherein the restriction spring coils tightly around the outer case of the one-way clutch such that the one-way clutch is not rotating when the connecting shaft drives the abutting member to move away from the free end of restriction spring, and the cord collecting wheel is allowed to rotate in a second direction by the one-way clutch.

5. The window covering control assembly of claim 3, wherein the driving module further comprises a driving unit; wherein the speed control module further comprises a connecting shaft and an abutting member which is sleeved to the connecting shaft and positioned corresponding to the restriction spring, wherein the restriction spring is sleeved to one of the driving unit and the cord collecting wheel; the cord collecting wheel is configured to rotate with respect to the restriction spring when the connecting shaft drives the abutting member to push the free end of the restriction spring to increase the diameter of the restriction spring; at the same time, the restriction spring is in contact with the corresponding driving unit or cord collecting wheel which is sleeved by the restriction spring to generate the resistance force and reduce the rotating speed of the cord collecting wheel.

6. The window covering control assembly of claim 5, wherein the driving unit of the driving module comprises a resilient member; the cord collecting wheel is configured to rotate in a second direction while a second driving force is acting upon the cord collecting wheel, wherein the second driving force is a recovery force from the resilient member, and wherein the first driving force is greater than the second driving force.

7. The window covering control assembly of claim 6, wherein the resilient member is a spiral spring having a winding diameter; while the cord collecting wheel is rotating in the first direction, the winding diameter reduces; the friction member is engaged to a connecting shaft to operate simultaneously with the connecting shaft; the connecting shaft is configured to drive the friction member to contact with the spiral spring to generate the resistance force when the cord collecting wheel begins to rotate in the first direction such that the rotating speed of the cord collecting wheel in the first direction is reduced, wherein the resistance force is not generated when the friction member is not in contact with the spiral spring due to a reduction of the winding diameter while the cord collecting wheel rotating in the first direction and the cord collecting wheel is configured to continue rotating in the first direction by the first driving force.

8. The window covering control assembly of claim 6, wherein the driving unit comprises a driving wheel and a storing wheel positioned adjacent to each other; the resilient member is a spiral spring having two ends, and the two ends of the spiral spring are respectively positioned corresponding to the driving wheel and the storing wheel; in an initial state of the spiral spring, the spiral spring winds around the storing wheel and has a winding diameter, and the weight element is at a position closest to the shell when the spiral spring is in the initial state.

9. The window covering control assembly of claim 8, wherein the friction member is positioned corresponding to the spiral spring which winds around the storing wheel, wherein the winding diameter reduces while the cord collecting wheel is rotating in the first direction; the friction member comprises a adjuster for controlling the friction member between contacting or not contacting the spiral spring; the adjuster is configured to drive the friction member to contact with the spiral spring to generate the resistance force when the cord collecting wheel begins to rotate in the first direction such that the rotating speed of the cord collecting wheel in the first direction is reduced, wherein the resistance force is not generated when the friction member is not in contact with the spiral spring due to a reduction of the winding diameter while the cord collecting wheel rotating in the first direction and the cord collecting wheel is configured to continue rotating in the first direction by the first driving force.

10. The window covering control assembly of claim 9, wherein the adjuster comprises a connecting shaft, an abutting wheel on the connecting shaft, and a sliding unit; the friction member is provided in the sliding unit and positioned corresponding to the spiral spring; the resistance force is generated when the connecting shaft drives the abutting wheel to push the sliding unit to move toward the spiral spring and the friction member is in contact with the spiral spring; when the diameter of the spiral spring reduces to a predetermined value, the friction member is not in contact with the spiral spring.

11. The window covering control assembly of claim 10, wherein the friction member comprises a biasing member which is in the sliding unit; a friction surface of the friction member is faced to the spiral spring by the biasing member when the friction member is in contact with spiral spring.

12. The window covering control assembly of claim 9, wherein the adjuster comprises a connecting shaft, a clamping member, and a separating member; the friction member is provided on one side of the clamping member, wherein the side of the clamping member and the friction member faces to the spiral spring; the separating member is positioned corresponding to and received by the clamping member and is configured to operate synchronously with the connecting shaft, wherein the separating member defines a distance between the clamping member and center of the spiral spring, and variation of the distance causes the friction member being in contact with the spiral spring to generate the resistance force.

13. The window covering control assembly of claim 12, wherein the clamping member comprises a clamping aim and a contracting member which is provided on one end of the clamping arm to urge the clamping arm to contact with the separating member constantly, wherein the separating member comprised a connecting wheel and a stepped wheel, wherein the connecting wheel is provided on the connecting shaft and connected to the stepped wheel which has a diameter that defines the distance, wherein the stepped wheel comprises at least one concave structure defined from the circumference of the stepped wheel; the resistance force is generated when the friction member is in contact with the spiral spring as the clamping arm is received in the concave structure due to reduction of the distance.

14. A window covering system, comprising a shell, a weight element, a covering material, at least one lifting cord through the covering material, and a window covering control assembly, wherein the covering material is provided between the shell and the weight element, and one end of the lifting cord is connected to the window covering control assembly, and the other end of the lifting cord is connected to the weight element, wherein the lifting cord controls collection and expansion of the covering material by the window covering control assembly and allows the weight element to descend away or ascend close to the shell, wherein the window covering control assembly comprises:

a driving module provided in the shell and engaged to the weight element to operate simultaneously with the weight element, wherein the driving module comprises a cord collecting assembly, wherein the driving unit and the cord collecting assembly are engaged to move simultaneously, wherein the cord collecting assembly is mounted in the shell, wherein one end of the lifting cord away from the weight element is connected to the cord collecting assembly; the cord collecting assembly is configured to operate in a first direction which releases the lifting cord while a first driving force acts upon the cord collecting assembly such that the weight element descends away from the shell and the covering material expands, wherein the first driving force comprises at least a weight of the weight element; and a speed control module positioned corresponding to the driving module, wherein a resistance force is selectively generated between the speed control module and the driving module, and wherein a rotating speed of the cord collecting assembly in the first direction is reduced when the resistance force is generated between the speed control module and the driving module such that a descending speed of the weight element is reduced.

15. The window covering system of claim 14, wherein the cord collecting assembly comprises a cord collecting wheel; wherein the resistance force is a friction force; the speed control module comprises a friction member, the friction member is positioned corresponding to the cord collecting wheel; while the cord collecting wheel is rotating in the first direction, the friction member provides the friction force to the driving module to reduce the rotating speed of the cord collecting wheel.

16. The window covering system of claim 15, wherein the friction member is a restriction spring is fixed to the shell, and the other end of the restriction spring is a free end; the diameter of the restriction spring is changed when a position of the free end is changed.

17. The window covering system of claim 16, wherein the speed control module further comprises a connecting shaft, an abutting member and a one-way clutch, wherein the abutting member is sleeved to the connecting shaft and positioned corresponding to the restriction spring, and the one-way clutch is positioned corresponding to the cord collecting wheel, and an outer case of the one-way clutch is coiled by the restriction spring; the one-way clutch is configured to rotate with respect to the restriction spring when the connecting shaft drives the abutting member to push the free end of the restriction spring to increase the diameter of the restriction spring, and the cord collecting wheel is configured to rotate with the one-way clutch synchronously such that the cord collecting wheel rotates in the first direction to release the lifting cord, and the restriction spring is in contact with the outer case of the one-way clutch to generate the restriction force to reduce the rotating speed of the one-way clutch and the cord collecting wheel; the restriction spring is configured to coil tightly around the outer case of the one-way clutch when the connecting shaft drives the abutting member to move away from the free end of restriction spring such that the one-way clutch is not rotating, and the cord collecting wheel is allowed to rotate in the second direction by the one-way clutch.

18. The window covering system of claim 16, wherein the driving module further comprises a driving unit; wherein the speed control module further comprises a connecting shaft and an abutting member which is sleeved to the connecting shaft and positioned corresponding to the restriction spring, wherein the restriction spring is sleeved to one of the driving unit or the cord collecting wheel, wherein the restriction spring is configured to operate simultaneously with the cord collecting wheel; the cord collecting wheel is configured to rotate with respect to the restriction spring when the connecting shaft drives the abutting member to push the free end of the restriction spring to increase the diameter of the restriction spring; at the same time, the restriction spring is in contact with the corresponding driving unit or cord collecting wheel which is sleeved by the restriction spring to generate the resistance force and reduce the rotating speed of the cord collecting wheel.

19. The window covering system of claim 18, wherein the driving unit of the driving module comprises a resilient member; the cord collecting wheel is configured to rotate in a second direction to collect the lifting cord while a second driving force is acting upon the cord collecting wheel, wherein the second driving force is a recovery force from the resilient member, and wherein the first driving force is greater than the second driving force.

20. The window covering system of claim 19, wherein the resilient member is a spiral spring having a winding diameter; while the cord collecting wheel is rotating in the first direction, the winding diameter reduces; the friction member is engaged to a connecting shaft to operate simultaneously with the connecting shaft; the connecting shaft is configured to drive the friction member to contact with the spiral spring to generate the resistance force when the cord collecting wheel begins to rotate in the first direction such that the rotating speed of the cord collecting wheel in the first direction is reduced, wherein the resistance force is not generated when the friction member is not in contact with the spiral spring due to a reduction of the winding diameter while the cord collecting wheel rotating in the first direction and the cord collecting wheel is configured to continue rotating in the first direction by the first driving force.

21. The window covering system of claim 19, wherein the driving unit comprises a driving wheel and a storing wheel positioned adjacent to each other; the resilient member is a spiral spring having two ends, and the two ends of the spiral spring are respectively positioned corresponding to the driving wheel and the storing wheel; in an initial state of the spiral spring, the spiral spring winds around the storing wheel and has a winding diameter, and the weight element is at a position closest to the shell when the spiral spring is in the initial state.

22. The window covering system of claim 21, wherein the friction member is positioned corresponding to the spiral spring which winds around the storing wheel, wherein the winding diameter reduces and the weight element descends sway from the position closest to the shell while the cord collecting wheel is rotating in the first direction; the friction member comprises a adjuster for controlling the friction member between contacting or not contacting the spiral spring; the adjuster is configured to drive the friction member to contact with the spiral spring to generate the resistance force when the cord collecting wheel begins to rotate in the first direction such that the rotating speed of the cord collecting wheel in the first direction is reduced, wherein the resistance force is not generated when the friction member is not in contact with the spiral spring due to a reduction of the winding diameter while the cord collecting wheel rotating in the first direction and the cord collecting wheel is configured to continue rotating in the first direction by the first driving force such that the covering material keeps expanding.

23. The window covering system of claim 22, wherein the adjuster comprises a connecting shaft, an abutting wheel on the connecting shaft, and a sliding unit; the friction member is provided in the sliding unit and positioned corresponding to the spiral spring; the resistance force is generated when the connecting shaft drives the abutting wheel to push the sliding unit to move toward the spiral spring and the friction member is in contact with the spiral spring; when the diameter of the spiral spring reduces to a predetermined value, the friction member is not in contact with the spiral spring.

24. The window covering system of claim 23, wherein the friction member comprises a biasing member which is in the sliding unit; a friction surface of the friction member is faced to the spiral spring by the biasing member when the friction member is in contact with spiral spring.

25. The window covering system of claim 22, wherein the adjuster comprises a connecting shaft, a clamping member, and a separating member; the friction member is provided on one side of the clamping member, wherein the side of the clamping member and the friction member faces to the spiral spring; the separating member is positioned corresponding to and received by the clamping member and is configured to operate synchronously with the connecting shaft, wherein the separating member defines a distance between the clamping member and center of the spiral spring, and variation of the distance causes the friction member being in contact with the spiral spring to generate the resistance force.

26. The window covering system of claim 25, wherein the clamping member comprises a clamping arm and a contracting member which is provided on one end of the clamping arm to urge the clamping arm to contact with the separating member constantly, wherein the separating member comprises a connecting wheel and a stepped wheel, wherein the connecting wheel is provided on the connecting shaft and connected to the stepped wheel which has a diameter that defines the distance, wherein the stepped wheel comprises at least one concave structure defined from the circumference of the stepped wheel; the resistance force is generated when the friction member is in contact with the spiral spring as the clamping arm is received in the concave structure due to reduction of the distance.

27. The window covering system of claim 14, further comprising a releasing module engaged to the window covering control assembly to operate simultaneously with the window covering control assembly, wherein the releasing module is configured to restrict the cord collecting assembly from operating in the first direction and allow the cord collecting assembly to operate in a direction which is opposite to the first direction.

28. The window covering system of claim 27, further comprising a slat adjusting module connected to the releasing module, wherein the slat adjusting module comprises an operating member and a tilting unit, wherein the tilting unit is configured to operate with the covering material simultaneously and connected to the releasing module, wherein the tilting unit and the releasing module are configured to be driven by the operating member to operate simultaneously, wherein the operating member is configured to control the tilting unit to change a light transmittance of the covering material.

* * * * *